United States Patent
Zheng et al.

(10) Patent No.: US 11,099,804 B2
(45) Date of Patent: Aug. 24, 2021

(54) PANEL DRIVER INTERFACE SYSTEMS AND METHODS FOR ELECTRONIC DEVICE DISPLAYS

(71) Applicant: Apple Inc., Cupertino, CA (US)

(72) Inventors: Fenghua Zheng, San Jose, CA (US); David S. Zalatimo, San Jose, CA (US); James E. Brown, San Jose, CA (US); Sachiko Oda, San Jose, CA (US); Johan L. Piper, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 68 days.

(21) Appl. No.: 16/529,705

(22) Filed: Aug. 1, 2019

(65) Prior Publication Data

US 2020/0042264 A1 Feb. 6, 2020

Related U.S. Application Data

(60) Provisional application No. 62/714,044, filed on Aug. 2, 2018.

(51) Int. Cl.
*G06F 3/147* (2006.01)
*G09G 5/00* (2006.01)

(52) U.S. Cl.
CPC ............. *G06F 3/147* (2013.01); *G09G 5/005* (2013.01)

(58) Field of Classification Search
None
See application file for complete search history.

(56) References Cited

U.S. PATENT DOCUMENTS

| | | | |
|---|---|---|---|
| 7,844,886 B1* | 11/2010 | Ngo | G06F 11/1004 714/785 |
| 8,332,722 B1* | 12/2012 | Vera Rojas | H03M 13/3776 714/758 |
| 2010/0130257 A1* | 5/2010 | Jang | G06F 3/0412 455/566 |
| 2016/0266964 A1* | 9/2016 | Uekusa | H03K 19/17764 |

* cited by examiner

*Primary Examiner* — Patrick N Edouard
*Assistant Examiner* — Peijie Shen
(74) *Attorney, Agent, or Firm* — Aikin & Gallant, LLP

(57) ABSTRACT

Aspects of the subject technology relate to electronic device display circuitry and methods of operating the display. The display circuitry a panel driver interface that decodes digital display data, for each display frame, received from host circuitry of the electronic device. The digital display data includes error correction and detection information for frame and line configuration information distributed in a frame packet and multiple line packets for each display frame. The frame and line configuration information facilitates, efficient, low-error, digital control of various display operational features.

24 Claims, 25 Drawing Sheets

- EQUAL OR MORE THAN 3 OF 5 SHUTDOWN CODES MATCH STARTS SYNCHRONOUS DISCHARGE

- PWDN=1 WILL BRING NEXT STATE TO DEEP SLEEP DPS WILL TURN ON ANALOG POWER SAVING BUT KEEP CURRENT STATE CDR UNLOCK WILL BRING NEXT SATE TO TRAINING

- PWDN=1 WILL BRING NEXT STATE TO SLEEP DPS HAS NO IMPACT CDR UNLOCK WILL BRING NEXT STATE TO TRAINING

- REGARDLESS OF THE STATE, VCC<VDdscg_th WILL BRING ALL GATE DRIVER OUTPUTS HIGH FOR ASYNCHRONOUS DISCHARGE ( SX_MBC=1 DSCG_FLAG=X )

( SYNCHRONOUS DISCHARGE )

( ASYNCHRONOUS DISCHARGE )

*FIG. 9E*

1201 — HOST CIRCUITRY GENERATES THE DIGITAL DISPLAY DATA BY PERFORMING A HAMMING ENCODING OF FRAME CONFIGURATION BITS FOR THE DISPLAY FRAME TO FORM THE ERROR-CORRECTION ENCODED FRAME CONFIGURATION BITS AND PERFORMING HAMMING ENCODINGS OF LINE CONFIGURATION BITS FOR EACH OF THE LINE PACKETS TO FORM THE ERROR-CORRECTION ENCODED LINE CONFIGURATION BITS.

1210 — GENERATING THE DIGITAL DISPLAY DATA WITH THE HOST CIRCUITRY FURTHER COMPRISES PERFORMING A BIT SWAPPING OPERATION ON THE HAMMING ENCODED FRAME CONFIGURATION BITS AND PERFORMING BIT SWAPPING OPERATIONS ON THE HAMMING ENCODED LINE CONFIGURATION BITS OF EACH OF THE LINE PACKETS.

*FIG. 12A*

1230 — THE AT LEAST ONE OF COLUMN DRIVER INTEGRATED CIRCUIT AND ROW DRIVER CIRCUITRY FOR THE DISPLAY PANEL PERFORMS A START-OF-FRAME ALIGNMENT OPERATION AND A START-OF-LINE ALIGNMENT OPERATION USING THE DECODED DIGITAL DISPLAY DATA FROM THE AT LEAST ONE OF PANEL DRIVER INTERFACE. THE START-OF-FRAME ALIGNMENT OPERATION COMPRISES PERFORMING A REDUNDANCY CHECK USING THE FRAME PACKET START BITS AND WHEREIN PERFORMING THE START-OF-LINE ALIGNMENT OPERATION COMPRISES PERFORMING A REDUNDANCY CHECK USING THE LINE PACKET START BITS.

1232 — THE AT LEAST ONE OF PANEL DRIVER INTERFACE PROVIDES TO THE HOST CIRCUITRY, A MULTI-PURPOSE BACKCHANNEL SIGNAL.

*FIG. 12D*

1238 — THE AT LEAST ONE OF COLUMN DRIVER INTEGRATED CIRCUIT AND ROW DRIVER CIRCUITRY FOR THE DISPLAY PANEL PROVIDES A SELF-ALIGNED CHARGING TIME OPERATION USING GATE CHARGE BASE BITS IN THE FRAME CONFIGURATION BITS IN THE DECODED DIGITAL DISPLAY DATA FROM THE AT LEAST ONE PANEL DRIVER INTERFACE AND USING PIXEL CHARGE TIMING BITS IN LINE CONFIGURATION BITS IN THE DECODED DIGITAL DISPLAY DATA FROM THE AT LEAST ONE PANEL DRIVER INTERFACE.

1239 — THE AT LEAST ONE OF COLUMN DRIVER INTEGRATED CIRCUIT AND ROW DRIVER CIRCUITRY FOR THE DISPLAY PANEL PROVIDES A ROW RE-ORDERING OPERATION USING GATE DRIVER INTEGRATED CIRCUIT ACTIVE CHANNEL ADDRESS BITS IN THE LINE CONFIGURATION BITS IN THE DECODED DIGITAL DISPLAY DATA FROM THE AT LEAST ONE OF PANEL DRIVER INTERFACE.

*FIG. 12F*

1240 — THE AT LEAST ONE OF COLUMN DRIVER INTEGRATED CIRCUIT AND ROW DRIVER CIRCUITRY FOR THE DISPLAY PANEL PERFORMS A ROW-BASED REFRESH OPERATION BASED ON THE GATE DRIVER INTEGRATED CIRCUIT ACTIVE CHANNEL ADDRESS BITS IN THE LINE CONFIGURATION BITS IN THE DECODED DIGITAL DISPLAY DATA FROM THE AT LEAST ONE OF PANEL DRIVER INTERFACE.

1242 — THE AT LEAST ONE OF COLUMN DRIVER INTEGRATED CIRCUIT AND ROW DRIVER CIRCUITRY FOR THE DISPLAY PANEL PERFORMS AN INTRA-FRAME POLARITY CHANGE OPERATION BASED ON THE GATE DRIVER INTEGRATED CIRCUIT ACTIVE CHANNEL ADDRESS BITS IN THE LINE CONFIGURATION BITS IN THE DECODED DIGITAL DISPLAY DATA FROM THE AT LEAST ONE OF PANEL DRIVER INTERFACE.

*FIG. 12G*

1244 — THE AT LEAST ONE OF COLUMN DRIVER INTEGRATED CIRCUIT AND ROW DRIVER CIRCUITRY FOR THE DISPLAY PANEL PERFORMS A DIGITAL VCOM OPERATION USING VCOM ESTIMATOR BITS IN THE FRAME CONFIGURATION BITS IN THE DECODED DIGITAL DISPLAY DATA FROM THE AT LEAST ONE OF PANEL DRIVER INTERFACE.

*FIG. 12H*

PANEL DRIVER INTERFACE SYSTEMS AND METHODS FOR ELECTRONIC DEVICE DISPLAYS

RELATED APPLICATIONS

This application claims the benefit of priority of U.S. Provisional Application No. 62/714,044 filed Aug. 2, 2018 which is incorporated herein by reference.

TECHNICAL FIELD

The present description relates generally to electronic device displays, and more particularly, but not exclusively, to panel driver interfaces for electronic device displays.

BACKGROUND

Electronic devices such as computers, media players, cellular telephones, set-top boxes, and other electronic equipment are often provided with displays for displaying visual information. Displays such as organic light-emitting diode (OLED) displays and liquid crystal displays (LCDs) are commonly provided in portable electronic devices and typically include an array of display pixels arranged in pixel rows and pixel columns. These displays are typically used to display text, images, and video for viewing by a user.

The text, images, and videos are displayed by operating the pixel rows and pixel columns using a row driver to provide gate signals to the pixel rows and a column driver to provide data signals to the pixel columns. However, the various protocols used by various display panel manufacturers for providing data to the column drivers can be difficult to integrate across devices, can be inefficient with respect to speed and power consumption, and can require additional dedicated circuitry to provide some desired display control features.

SUMMARY OF THE DESCRIPTION

In accordance with various aspects of the subject disclosure, a method of operating a display of an electronic device is provided. The display includes a display panel with an array of display pixels arranged in pixel rows and pixel columns, at least one column driver integrated circuit communicatively coupled to the pixel columns, and at least one panel driver interface communicatively coupled between host circuitry for the electronic device and the at least one column driver integrated circuit. The method includes transmitting, from the host circuitry to the panel driver interface, digital display data corresponding to a display frame for display. The digital display data includes a frame packet for the display frame, the frame packet including error-correction encoded frame configuration bits. The display data also includes a plurality of line packets for the display frame, each line packet including error-correction encoded line configuration bits and pixel data for display by a pixel row. The method also includes decoding the digital display data using the at least one panel driver interface. The method also includes providing the decoded digital display data from the at least one panel driver interface to the at least one column driver integrated circuit for operation of at least one of the pixel columns.

In accordance with other aspects of the subject disclosure, a method of operating a display panel of an electronic device display is provided, the method including receiving, with a panel driver interface on the display panel, digital display data corresponding to a display frame for display by an array of display pixels on the display panel. The digital display data includes a frame packet for the display frame, the frame packet including error-correction encoded frame configuration bits. The digital display data also includes a plurality of line packets for the display frame, each line packet including error-correction encoded line configuration bits and pixel data for display by a pixel row. The method also includes decoding the digital display data with the panel driver interface. The method also includes providing the decoded digital display data to at least one column driver integrated circuit on the display panel for operation of at least one column of display pixels in the array.

In accordance with other aspects of the subject disclosure, a display for an electronic device having host circuitry is provided, the display including a display panel having an array of display pixels arranged in pixel rows and pixel columns, at least one column driver integrated circuit communicatively coupled to the pixel columns, and at least one panel driver interface communicatively coupled between host circuitry for the electronic device and the at least one column driver integrated circuit. The at least one panel driver interface is configured to receive, from the host circuitry, digital display data corresponding to a display frame for display. The digital display data includes a frame packet for the display frame, the frame packet comprising error-correction encoded frame configuration bits. The digital display data further includes a plurality of line packets for the display frame, each line packet including error-correction encoded line configuration bits and pixel data for display by a pixel row. The at least one panel driver interface is further configured to decode the digital display data and provide the decoded digital display data to the at least one column driver integrated circuit for operation of at least one of the pixel columns.

BRIEF DESCRIPTION OF THE DRAWINGS

Certain features of the subject technology are set forth in the appended claims. However, for purpose of explanation, several embodiments of the subject technology are set forth in the following figures.

FIGS. 9A-9E illustrate a schematic in-band discharge state diagram of a panel driver interface in accordance with various aspects of the subject technology.

FIGS. 12A-12H illustrate a flow chart of an example process for operating an electronic device display in accordance with various aspects of the subject technology.

DETAILED DESCRIPTION

Figure 1:
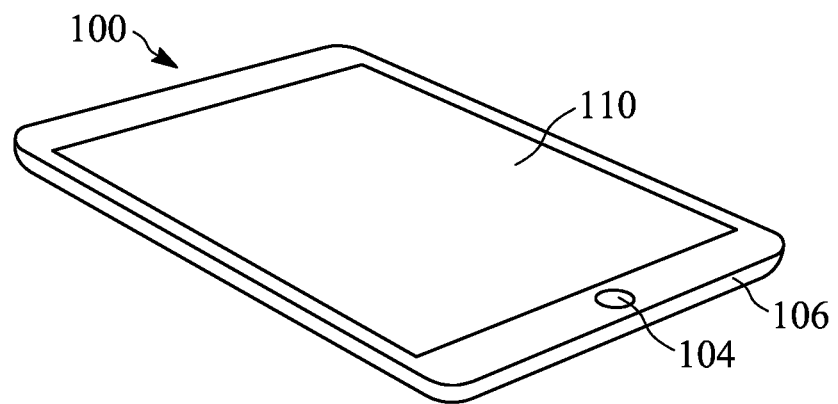
FIG. 1 illustrates a perspective view of an example electronic device having a display in accordance with various aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject disclosure provides control circuitry for electronic device displays such as organic light-emitting diode (OLED) displays, liquid crystal displays (LCDs), plasma displays, or displays based on other display technologies. In accordance with various aspects, a panel driver interface is provided that, along with the disclosed protocols for communications through the interface, facilitates digital control of column driver and/or gate driver circuitry that operates an array of display pixels on the display panel.

In accordance with various aspects of the subject technology, the panel driver interface provides a high-speed data link between host circuitry and display panel circuitry. The panel driver interface also includes a multi-purpose back-channel pin that can be used for locking the display panel circuitry for high speed transmission and/or providing display panel information to the host circuitry, and a power-down pin that can be used to power down one or more driver circuits of the display panel to reduce power consumption by the display panel.

Panel configuration data and display data are transmitted to the display panel from the host circuitry via the panel driver interface using a data protocol described herein in which relatively static configuration bits, which are not updated every line, are transmitted on a frame-by-frame basis in a frame packet during a vertical blanking period. Configuration bits relevant to specific gate lines or pixel rows are transmitted for each line, together with the pixel data for that line in a line packet. In this way, payload efficiency is improved by reducing repeated transmission of frame-related configuration data. In accordance with various aspects, frame configuration packets and line configuration packets are encoded and include cyclic redundancy check information to provide one-bit error correction and detection of uncorrected errors.

The panel driver interface and the associated data protocol described herein facilitate digital control of the display panel with error protection at the frame and line level, reduced power consumption, and enhanced efficiency and speed in comparison with conventional systems and methods.

An illustrative electronic device having a display is shown in FIG. 1. In the example of FIG. 1, device 100 has been implemented using a housing that is sufficiently small to be portable and carried by a user (e.g., device 100 of FIG. 1 may be a handheld electronic device such as a tablet computer or a cellular telephone). As shown in FIG. 1, device 100 includes a display such as display 110 mounted on the front of housing 106. Display 110 may include a display panel having active display pixels in an active area of the display and control circuitry for operating the active display pixels in an inactive portion. Display 110 may have openings (e.g., openings in the inactive or active portions of display 110) such as an opening to accommodate button 104 and/or other openings such as an opening to accommodate a speaker, a light source, or a camera.

Display 110 may be a touch screen that incorporates capacitive touch electrodes or other touch sensor components or may be a display that is not touch-sensitive. Display 110 includes display pixels formed from light-emitting diodes (LEDs), organic light-emitting diodes (OLEDs), plasma cells, electrophoretic display elements, electrowetting display elements, liquid crystal display (LCD) components, or other suitable display pixel structures. Arrangements in which display 110 is formed using liquid crystal display (LCD) components and a backlight such as two-dimensional array of LEDs that backlight LCD pixels are sometimes described herein as an example. This is, however, merely illustrative. In various implementations, any suitable type of display pixel technology may be used in forming display 110 if desired.

Housing 106, which may sometimes be referred to as a case, may be formed of plastic, glass, ceramics, fiber composites, metal (e.g., stainless steel, aluminum, etc.), other suitable materials, or a combination of any two or more of these materials.

The configuration of electronic device 100 of FIG. 1 is merely illustrative. In other implementations, electronic device 100 may be a computer such as a computer that is integrated into a display such as a computer monitor, a laptop computer, a somewhat smaller portable device such as a wrist-watch device, a pendant device, or other wearable or miniature device, a media player, a gaming device, a navigation device, a computer monitor, a television, or other electronic equipment.

For example, in some implementations, housing 106 may be formed using a unibody configuration in which some or all of housing 106 is machined or molded as a single structure or may be formed using multiple structures (e.g., an internal frame structure, one or more structures that form exterior housing surfaces, etc.). Although housing 106 of FIG. 1 is shown as a single structure, housing 106 may have multiple parts. For example, housing 106 may have upper portion and lower portion coupled to the upper portion using a hinge that allows the upper portion to rotate about a rotational axis relative to the lower portion. A keyboard such as a QWERTY keyboard and a touch pad may be mounted in the lower housing portion, in some implementations.

In some implementations, electronic device 100 is provided in the form of a computer integrated into a computer monitor. Display 110 may be mounted on a front surface of housing 106 and a stand may be provided to support housing (e.g., on a desktop).

Figure 2:
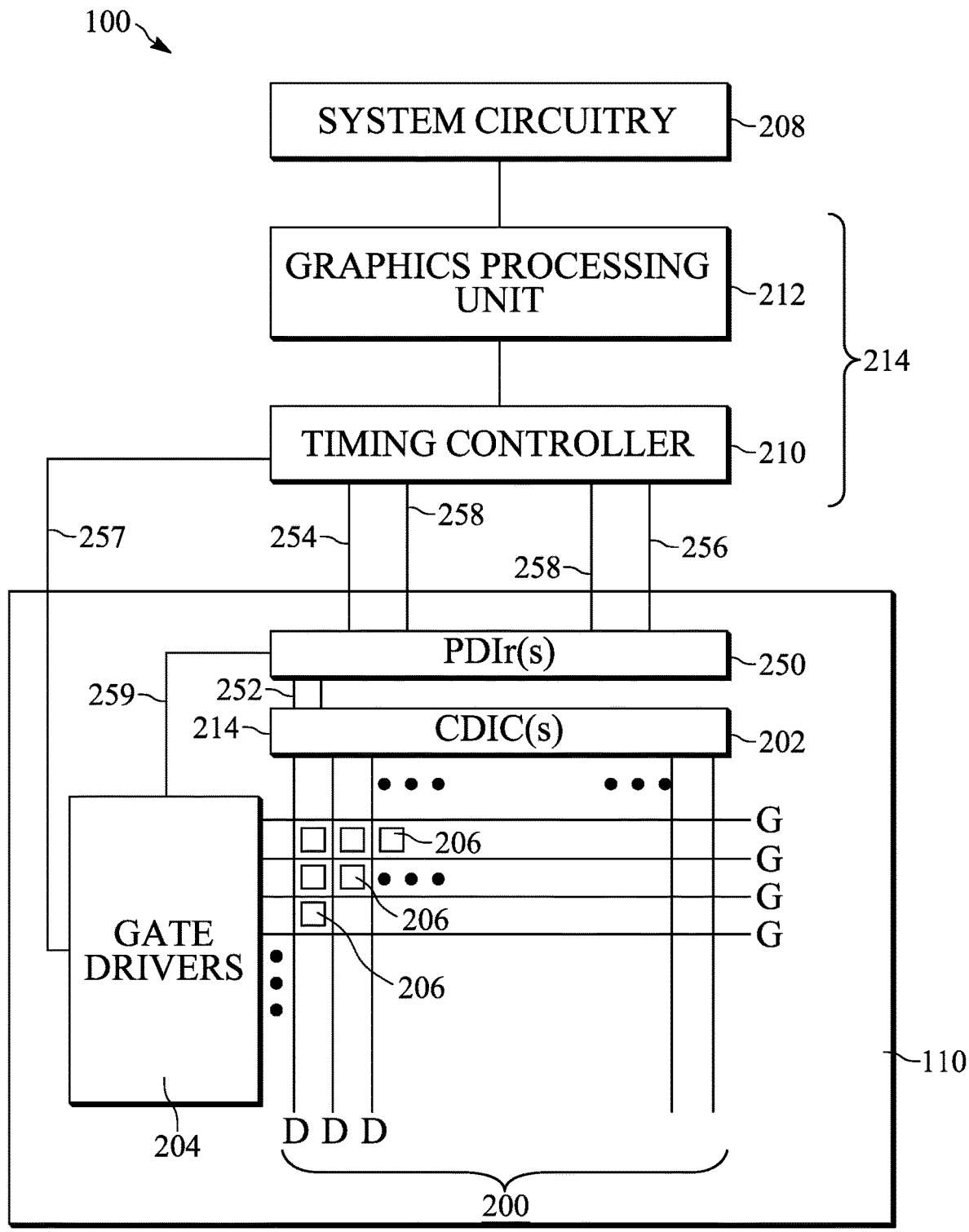
FIG. 2 illustrates a schematic diagram of exemplary display circuitry in accordance with various aspects of the subject technology.

FIG. 2 is a schematic diagram of device 100 showing illustrative circuitry that may be used in displaying images for a user of device 100 on pixel array 200 of display 110. As shown in FIG. 2, display 110 may include column driver circuitry such as one or more column driver integrated circuits (CDICs) 202 that drive data signals (analog voltages) onto the data lines D of array 200. Display 110 may also include gate driver circuitry such as one or more gate drivers 204 (e.g., gate driver integrated circuits or GDICs) that drive gate line signals onto gate lines G of array 200.

Using the data lines D and gate lines G, display pixels 206 may be operated to display images on display 110 for a user. In some implementations, CDIC(s) 202 may be mounted on the display substrate with display pixels 206 or attached to the display substrate by a flexible printed circuit or other connecting layer. In some implementations, gate driver circuitry 204 may be implemented using thin-film transistor circuitry on a display substrate such as a glass or plastic display substrate or may be implemented using integrated circuits that are mounted on the display substrate or attached to the display substrate by a flexible printed circuit or other connecting layer. For example, gate driver circuitry 204 may include a plurality of gate driver integrated circuits directly formed on the display panel substrate (e.g., each configured to provide one or more gate signals along one or more corresponding ones of signal gate lines G for one or more corresponding rows of display pixels 206).

As shown in FIG. 2, display 110 includes one or more panel driver interfaces 250. In the example of FIG. 2, panel driver interfaces 250 are receiver-side panel driver interfaces, denoted PDIr in the figure, that receive signals from host circuitry such as timing controller 210 using the data protocols described herein. As described in further detail hereinafter, PDIr(s) 250 decode the received signals from the host circuitry and provide data and control logic to CDIC(s) 202 and/or gate drivers 204 (e.g., along single lines 252 and/or 259 on the display panel).

Device 100 may include system circuitry 208. System circuitry 208 may include one or more different types of storage such as hard disk drive storage, nonvolatile memory (e.g., flash memory or other electrically-programmable-read-only memory), volatile memory (e.g., static or dynamic random-access-memory), magnetic or optical storage, permanent or removable storage and/or other non-transitory storage media configure to store static data, dynamic data, and/or computer readable instructions for processing circuitry in system circuitry 208. Processing circuitry in system circuitry 208 may be used in controlling the operation of device 100. Processing circuitry in system circuitry 208 may sometimes be referred to herein as system circuitry or a system-on-chip (SOC) for device 100.

The processing circuitry may be based on a processor such as a microprocessor and other suitable integrated circuits, multi-core processors, one or more application specific integrated circuits (ASICs) or field programmable gate arrays (FPGAs) that execute sequences of instructions or code, as examples. In one suitable arrangement, system circuitry 208 may be used to run software for device 100, such as internet browsing applications, email applications, media playback applications, operating system functions, software for capturing and processing images, augmented reality (AR) applications, virtual reality (VR) applications, three-dimensional (3D) video applications, etc.

During operation of device 100, system circuitry 208 may generate or receive data that is to be displayed on display 110. This display data may be processed, scaled, modified, and/or provided to display control circuitry such as graphics processing unit (GPU) 212. For example display frames, including display pixel values (e.g., each corresponding to a grey level) for display using pixels 206 (e.g., colored subpixels such as red, green, and blue subpixels) may be provided from system circuitry 208 to GPU 212. GPU 212 may process the display frames and provide processed display frames to timing controller integrated circuit 210.

Timing controller 210 provides digital display data (e.g., the digital pixel values each corresponding to a grey level for display) to CDIC(s) 202 via PDIr(s) 250. Timing controller 210 may include a transmitter-side panel driver interface circuitry (not explicitly shown in FIG. 1, see, e.g., FIG. 2) that encodes the digital display data for transmission to PDIr(s) 250 along, for example, a two-lane high-speed link 258, a PWDN control path 254, and a multi-purpose back channel (MBC) path 256. CDIC(s) 202 may receive the digital display data, following decoding by PDIr(s) 250 of the encoded data received from timing controller 210. Using digital-to-analog converter circuitry, bias circuitry, internal gamma voltage circuitry, level shifter circuitry, shift register circuitry, and/or the like within column driver circuitry 202, column driver circuitry 202 provides corresponding analog output signals on the data lines D running along the columns of display pixels 206 of array 200. Gate drivers 204 such as one or more gate driver integrated circuits (GDICs) on the display panel may receive timing and/or other control signals from timing controller 210 (e.g., via one or more signal paths such as signal path 257) and/or from PDIr(s) 250 (e.g., via one or more signal paths such as signal path 259).

Graphics processing unit 212 and timing controller 210 may sometimes collectively be referred to herein as display control circuitry 214. Display control circuitry 214 may be used in controlling the operation of display 110. Display control circuitry 214 may sometimes be referred to herein as a display driver, a display controller, a display driver integrated circuit (IC), or a driver IC. Graphics processing unit 212 and timing controller 210 may be formed in a common package (e.g., an SOC package) or may be implemented separately (e.g., as separate integrated circuits). In some implementations, timing controller 210 may be implemented separately as a display driver, a display controller, a display driver integrated circuit (IC), or a driver IC that receives processed display data from graphics processing unit 212. Accordingly, in some implementations, graphics processing unit 212 may be considered to be part of the system circuitry (e.g., together with system circuitry 208) that provides display data to the display control circuitry (e.g., implemented as timing controller 210, gate drivers 204, PDIr(s) 250, and/or CDIC(s) 202). Although a signal gate line G and a single data line D for each pixel 206 are illustrated in FIG. 2, this is merely illustrative and one or more additional row-wise and/or column-wise control lines may be coupled to each pixel 206 in various implementations.

Figure 3:
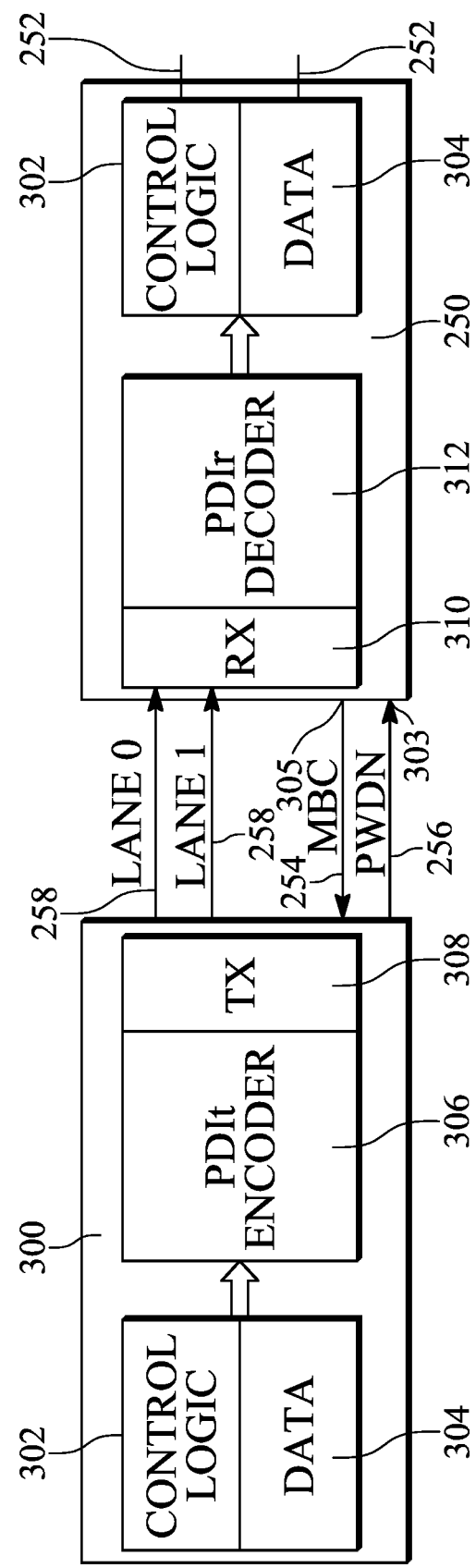
FIG. 3 illustrates a schematic block diagram of panel driver interface circuitry in accordance with various aspects of the subject technology.

FIG. 3 illustrates a block diagram of host circuitry 300 (e.g., timing controller 210, GPU 212, and/or system circuitry 208 implemented separately or together in a system on chip configuration with display 110) having a transmitter-side panel driver interface (PDIt) in communication with receiver-side PDIr 250. PDIr(s) 250 can be implemented separately from CDIC(s) 202 or each PDIr 250 can be integrated into a corresponding CDIC 202. Each CDIC 202 may be provided with a corresponding PDIr 250 or a PDIr may be used to decode and provide data and control logic to more than one CDIC.

The example of FIG. 3 shows a one port PDI 250 between host circuitry 300 and signal lines 252 to CDIC(s) 202. In the example of FIG. 3, PDI 250 consists of a two-lane high speed link 258 for data in two lanes labeled lane0 and lane1, a power down (PWDN) control pin 303 and a multi-purpose backchannel (MBC) pin 305. Host 300 uses high-speed link 258 to transmit CDIC configuration information together with pixel data. PWDN pin 303 is used to receive a powerdown signal from host 300 to put CDIC(s) 202 into a deep power saving mode when there is no data transmission. MBC pin 305 can be used to transmit a link lock feedback signal along path 354 to indicate to host 300 that a CDIC 202 is locked for high speed link transmission in a normal mode operation mode and/or can be used to read back CDIC internal register values during a test mode of operation. Although a one port PDI is shown in FIG. 3, PDI 250 may be provided with multiple ports, each port with two lanes, and each lane including a differential pair. Host 300 may support multiple ports for multiple CDICs at a specified data rate which depends on panel resolution and refresh rate.

As shown in FIG. 3, control logic 302 and data 304 for each of several display frames to be displayed by the display 110 are provided to PDIt encoder 306, which encodes the control logic and data as described herein for transmission of encoded digital display data, using transmitter (TX) 308, to PDI 250. As shown, receiver 310 receives the encoded digital display data and provides the encoded digital display data to PDIr decoder 312. PDIr decoder 312 decodes the encoded digital display data as described herein to extract the control logic 302 and data 304 to be provided to CDIC(s) 202 along paths 252. For example, control logic 302 may be provided to bias circuitry such as Gamma amplifier bias circuitry and/or main amplifier bias circuitry and data 304 may be provided to shift register, line latch, level shifter, DAC, and/or amplifier circuitry to provide analog data signals along data lines D.

Figure 4:
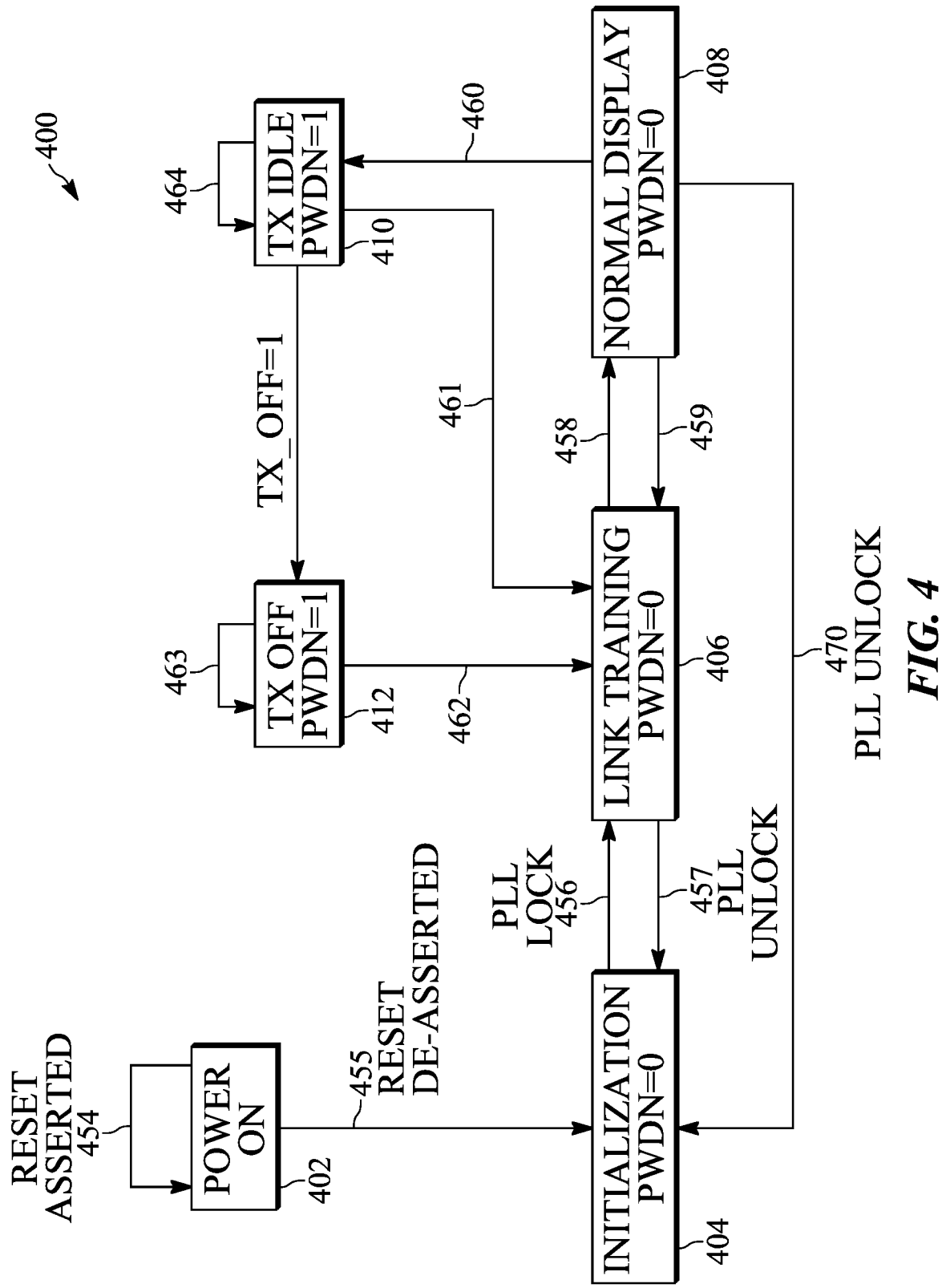
FIG. 4 illustrates a schematic state diagram of a panel driver interface transmitter in accordance with various aspects of the subject technology.

FIG. 4 shows a transmitter state diagram 400 for host circuitry 300. As shown, state diagram 400 includes six states for host circuitry 300 (referred to in this example as the transmitter, which may include PDIt encoder 306 and/or TX 308). The six states are a "Power On" state 402, an "Initialization" state 404, a "Link Training" state 406, a "Normal Display" state 408, a "TX Idle" state 410, and a 'TX off' state 412.

As indicated in FIG. 4, after power on 402, RESET asserted 454, and when the voltage rail or rails are stabilized, a RESET is released (de-asserted 455) and the transmitter is in the "Initialization" state 404. During initialization, the transmitter output sends a logic low value (e.g., differential 0) to PDIr 250. After the transmitter (e.g., the transmitter's phase lock loop (PLL)) is locked 456, the transmitter changes its state into the "Link Training" state 406.

After entering "Link Training" state 406, the transmitter continues sending a specific training pattern (e.g., a delay lock loop (DLL) and/or a phase lock loop (PLL) training pattern) for PDIr 250 to obtain a lock, and also monitors the receiver locking status through the returned MBC signal. PDIr 250 asserts, for example, MBC=1 at operation 458 if a lock is achieved. After the transmitter senses the MBC lock signal from PDIr 250, the transmitter enters "Normal Display" state 408 and starts to transmit control and data packets to the receiver. For example, the control and data packets may be digital display data corresponding to a display frame for display, the digital display data including (i) a frame packet for the display frame, the frame packet including error-correction encoded frame configuration bits, and (ii) line packets for the display frame, each line packet including error-correction encoded line configuration bits and pixel data for display by a pixel row (see, e.g., the description of FIG. 6A below for further details).

In "Normal Display" state 408, the transmitter continues monitoring the (e.g., TX PLL) locking status and MBC status. If, for example, the TX PLL unlocks at operation 457 or 470 the transmitter returns to the "Initialization" state 404, restarts the (e.g., PLL) locking process, then enters "Link Training" state 406 as noted above. If the transmitter senses, for example, MBC=0 at operation 459 during a powered on condition (e.g., PWDN=0), the transmitter returns to the "Link Training" state 406 to send a training pattern to re-lock the receiver clock data recovery (CDR). It should also be noted that PDIr(s) 250, and the associated protocols described herein, particularly facilitate providing multiple CDICs 202 attached to host circuitry 300 such as TCON 210. For example, when any one of CDICs 202 indicates loss of lock (e.g., by returning MBC=0), host circuitry 300 may force unlock of all other CDICs 202 or cause return of all other CDICs 202 to Link Training state 406 to cause any column drivers which have not unlocked to re-train and lock to a new phase associated with the new lock of the CDIC(s) that indicated loss of lock.

For example, the transmitter may also be provided with an option to toggle PWDN status (e.g., logic 1 pulse width>=100 ns) before sending link training. This can help ensure all CDICs 202 are in a training mode. When the host issues a power down signal (e.g., PWDN=1), MBC is ignored by the transmitter until PWDN goes back to low.

The transmitter also can use the PWDN signal to control CDIC power off by asserting, for example, PWDN=1. For example, power savings can be achieved during a vertical blanking (VBLANK) period. For example, a VBLANK_PS flag can be used to determine if the transmitter uses the power saving mode during VBLANK periods. For example, a VBLANK_PS flag value of one (e.g., operations 460, 463, 464) may indicate power saving during VBLANK and a VBLANK_PS value of zero (e.g., operations 461, 462) may indicate no power saving during VBLANK period.

When receiver circuitry at the display panel (e.g., RX 310, PDIr Decoder 312 and/or CDIC(s) 202) is completely shut down, transmitter circuitry 306 and/or 308 can stay on or be powered down to save power. The transmitter may also be provided with a register flag TX_OFF (e.g., operation 464 has TX_OFF=0, operation 463 has TX_OFF=1) to determine if the transmitter is to transition to "TX off" state 412 or stay at "TX Idle" state 410 by continuing to transmit signals. Additional system power savings can be achieved by, for example, entering "TX off" state 412 to power down the transmitter circuitry if, for example, internal register flag TX_OFF is set to a value of one. The transmitter may also be provided with an optional setting that the host circuitry 300 can ignore MBC for testing purposes.

Figure 5:
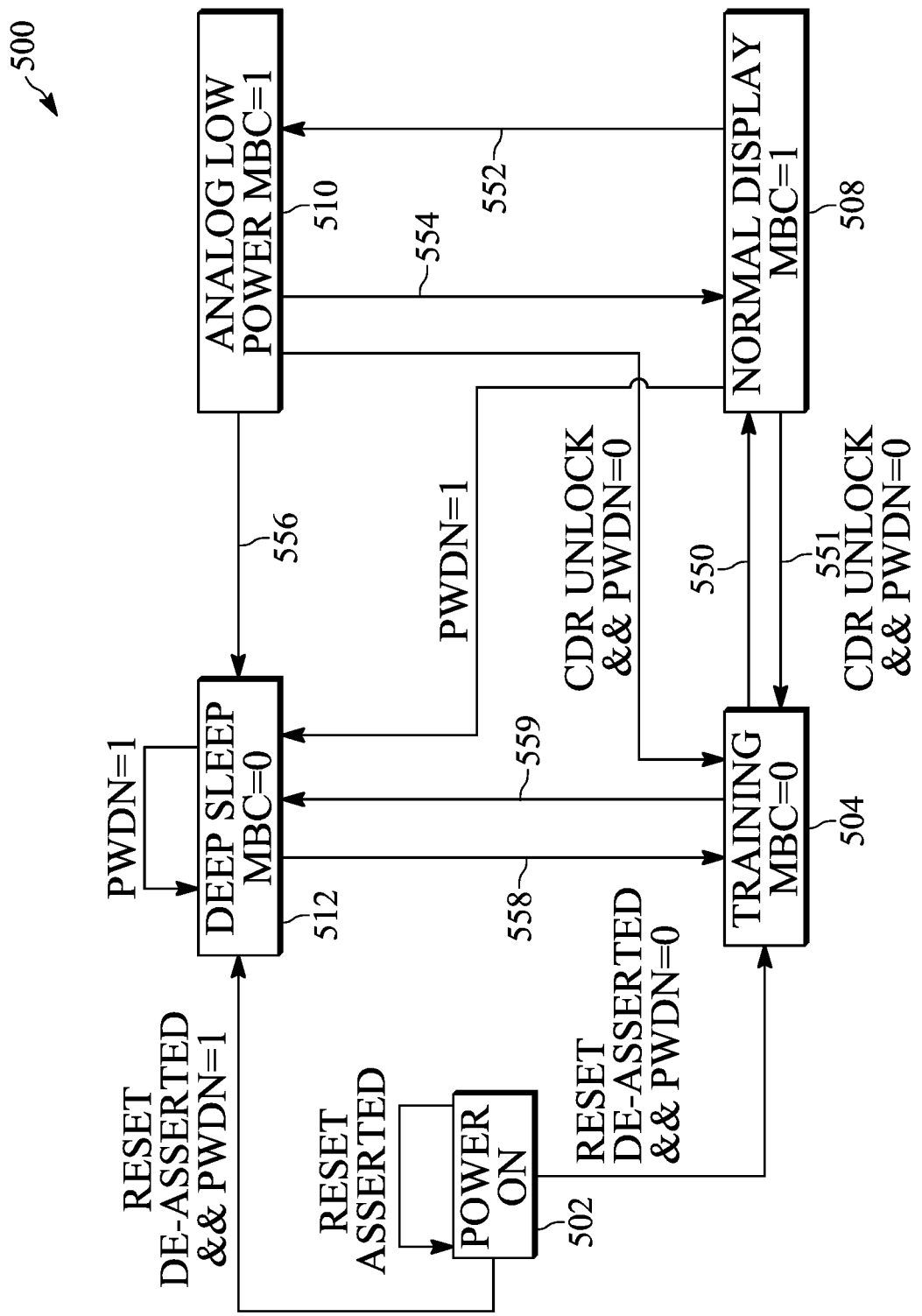
FIG. 5 illustrates a schematic state diagram of a panel driver interface receiver in accordance with various aspects of the subject technology.

FIG. 5 shows a receiver state diagram 500 for PDIr 250 and/or CDIC(s) 202. As shown, state diagram 500 includes five states for PDIr 250 and/or CDIC(s) 202 (referred to in this example as the receiver). As shown, the five states include a "Power On" state 502, a "Training" state 504, a "Normal Display" state 508, an "Analog Low Power" state 510, and a "Deep Sleep" state 512.

When the power supply is turned on, the receiver first enters in the "Training" state 504 for locking the receiver clock data recovery (CDR) block. The training time in "Training" state 504 is determined such that clock recovery can achieve lock. After locking the receiver CDR and PWDN=0 at operation 550, the receiver returns, for example, MBC=1, to cause the transmitter to enter "Normal Display" state 508 to transmit control and data packets.

Figure 6A:
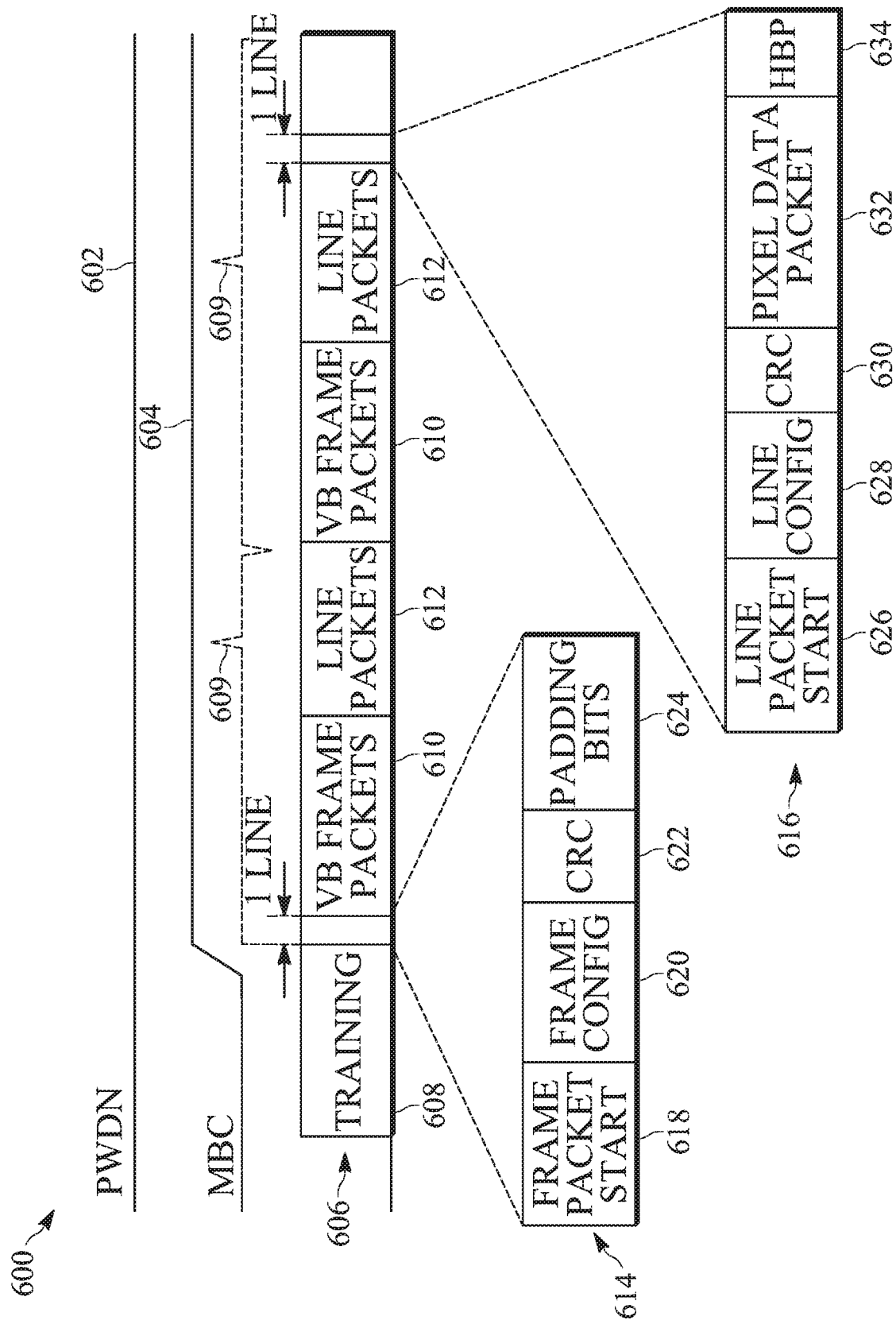
FIGS. 6A and 6B illustrate schematic diagrams of digital display data in accordance with various aspects of the subject technology.

In "Normal Display" state 508, the receiver receives frame packets and/or line packets from the transmitter and operates the display panel as instructed by the specific bits in the frame packets and/or line packets (see, e.g., FIG. 6A). At operation 551, CDR unlocks and PWDN=0. In cases of abnormal operation or malfunction of the receiver CDR, the receiver returns to the "Training" state 504 to lock to the transmitted training pattern, then de-asserts the MBC after lock is re-obtained. A "DPS" line configuration bit can control high voltage analog blocks inside the CDIC(s) 202. For example, a DPS line configuration value of one and PWDN=0 (e.g., operation 552) may cause power down of CDIC high voltage analog blocks and put the CDIC into "Analog Low Power" state 510, and a DPS line configuration value of zero and PWDN=0 (e.g., operation 554) may cause power up CDIC high voltage analog blocks and put the CDIC(s) 202 back to "Normal Display" state 508.

Host circuitry 300 can power down CDIC(s) 202 completely by, for example, asserting PWDN=1 to cause CDIC(s) 202 to enter "Deep Sleep" state 512 at operation 556. CDIC(s) 202 can be woken up from "Deep Sleep" state 512 to "Training" state 504 when, for example, PWDN=0 at operation 558 is provided from host circuitry 300. At operation 559, CDIC(s) 202 return to state 512 when PWDN=1.

Figure 6B:
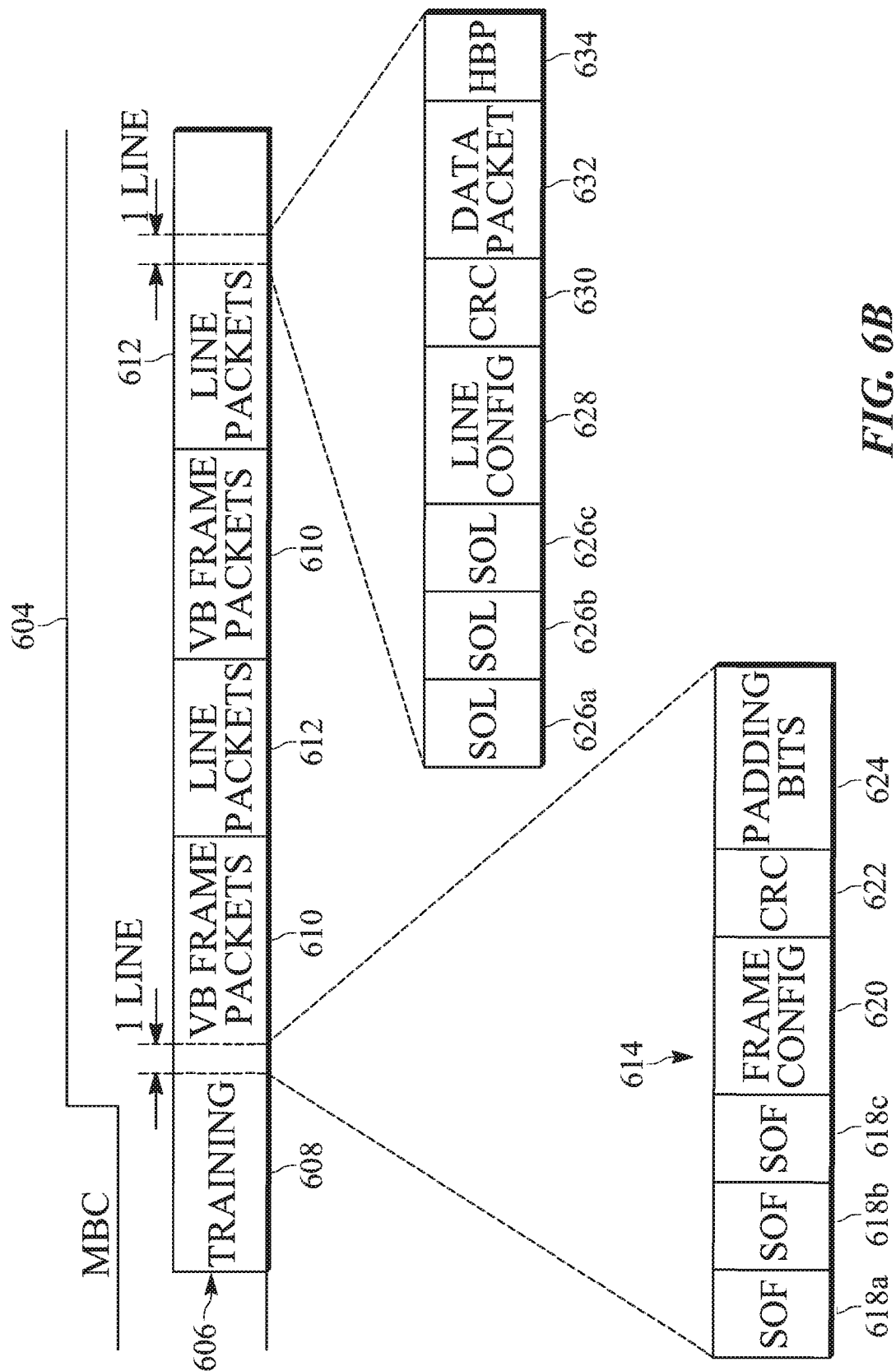

FIGS. 6A and 6B show an example of the digital display data that may be transmitted by host circuitry 300 to PDIr 250 for two display frames 609 when PWDN signal 602 is not asserted. As shown in FIG. 6A, MBC signal 604 is asserted when, during transmission of training data 608, a lock is achieved, so that the receiver can enter "Normal Display" mode 508, and digital display data for each of several display frames 609 can be transmitted from host circuitry 300 to PDIr 250. As shown, for each display frame 609, digital display data 606 includes a frame packet such as vertical blanking (VB) frame packet 610 and a line packet block 612 which includes a line packet 616 for each line or pixel row of the display panel.

A frame packet 610 is used to transmit relatively static control configuration information that applies to the entire display frame 609. A line packet 616 is used to transmit control information that needs to be updated each line, followed by data packets 632 and padding bits for that line or pixel row. The line packets 616 may each include two simultaneous packets, one on each of two lanes.

Relatively static configuration bits which are not updated every line can be transmitted on a frame-by-frame basis in a frame configuration packet 614 in frame packet 610. As shown, frame configuration packet 614 may be transmitted during a VBLANK period. Additional configuration bits that are relevant to particular lines are transmitted every line, together with the pixel data 632 for that line in the line packets 616. In this way, payload efficiency is improved since most of the configuration bits for a display frame can be sent once in a frame configuration packet 614. Frame packet and line packet configuration fields may be loaded into the internal registers of host circuitry 300 by firmware (or non-volatile memory (NVM)) during power-up, and transmitted to CDIC(s) 202 via PDIr(s) 250 using packets 614 and 616.

Frame packets 614 and line packets 616 are arranged to provide full flexibility to program any of the static fields through NVM programming. Control bits that are dynamically programmed may be managed by the host. All the configuration bits, including reserved bits may be accessible for programming for test purposes.

As shown in FIG. 6B, each frame configuration packet 614 may include four fields such as a frame packet start field 618 containing frame packet start bits (e.g., 618a, 618b, 618c), a frame configuration (Frame Config) field 620 including frame configuration bits, a frame configuration cyclic redundancy check (CRC) field 622 including CRC bits, and a padding field 624 containing padding bits.

Frame packet start bits 618a, 618b, and 618c in field 618 indicate the starting point of a frame or start-of-frame (SOF). These frame packet start bits can be transmitted multiple times and be identified by a receiver (e.g., PDIr 250) in order to avoid missing the frame packet 614. Frame configuration bits in field 620 may be error-correction encoded, scrambled, and/or otherwise processed (e.g., XOR'd) before transmission and may be decoded to obtain instructions for display of a corresponding display frame 609. CRC bits in field 622 may include a checksum for raw frame configuration bits (no redundancy). Padding bits in field 624 may be used to fill a remaining portion of a line time and may be, for example, scrambled zeros.

As shown, each line configuration packet 616 may include five fields such as a line packet start field 626 containing line packet start bits (e.g., 626a, 626b, 626c), a line configuration (Line Config) field 628 containing line configuration bits, a line configuration CRC field containing CRC bits 630, a pixel data packet field 632 containing pixel data for operation of display pixels 206, and a horizontal blanking period (HBP) field 634 that includes HBP bits.

As shown in FIG. 6A, line packet start field 626 is a start-of-line (SOL) packet that defines the start point of a line packet. These SOL packets can be transmitted multiple times and be identified by a receiver (e.g., PDIr 250) in order to avoid missing the line packet 612. Line configuration bits in field 628 may include error-correction encoded line configuration bits that can be decoded by PDIr 250 to obtain control logic for operation of lines of pixel array 200. If multiple lanes are used for each line packet 616, each lane has different line configuration bits. CRC field 630 may include a checksum (no redundancy) on each lane. Pixel data bits in field 632 includes the pixel data used by CDIC(s) 202 and/or row drivers 204 to operate pixels 206 to display each line of a display frame. Padding bits in HBP field 634 may extend to create a horizontal blanking period defined by the host.

Table 1 below lists various frame configuration bits that may be included (e.g., encoded, scrambled, and/or XOR'd) in frame configuration field 620 of frame configuration packet 614.

TABLE 1

| Frame Config Bit(s) Name | Exemplary description and/or illustrative values |
| --- | --- |
| Equalizer coefficient | Control the coefficient of equalizers |
| Rx bias control | Control RX bias current |
| Termination control | Control the termination resistance of the receiver for example, 80 ohm-110 ohm |
| CDR control | Control the CDR bandwidth, charge pump current. |
| Shift direction control | Shift direction control |
| Output channel number control | Channel number selection from minimum channel number to maximum channel number |

TABLE 1-continued

| Frame Config Bit(s) Name | Exemplary description and/or illustrative values |
| --- | --- |
| Desense test control | Desense test control |
| Gamma amp bias control | Gamma amp bias (e.g., between 60% and 100%) |
| Gamma amp chopping control | Gamma amp chopping method (e.g., 1 Frame + 1 Line, 1 Frame + 2 Line, 2 Frame + 1 Line, or 2 Frame + 2 Line) |
| Output amp bias control | Output amp bias from lowest bias to highest bias |
| Output amp chopping control | Chopping methods of output amp (e.g., 1 Frame + 1-Line, 1 Frame + 2-Line, 1 Frame + 4-Line, 2 Frame + 1-Line, 2 Frame + 2-Line, 2 Frame + 4-Line, or no chopping) |
| Slew rate control | Main buffer slew rate control from slowest slew rate to a fastest slew rate |
| Skew control | Skew control between output channels (e.g., between 50 ns to about 150 ns) |
| First half output amplifiers delay timing control | delay timing control for the first half of CDIC |
| Second half output amplifiers delay timing control | delay timing control for the second half of CDIC |
| CBBC enable | Enable/disable CBBC |
| CBBC mode | CBBC mode selection (e.g., low power bias control between 50% and 90%) |
| Read access control | Control the read access through MBC |
| CDIC Internal register address for read back | Start address of internal register in CDIC for read out depending on Read access control. |
| Data length control in read mode through MBC link | Control the data length transferred from CDIC to depending on Read access control from, e.g., 1 byte length to whole internal register length (e.g., including a Burst mode depending on the register address). |
| MBC period control | Set the period of MBC period control for read-back function |
| Frame/line config consecutive CRC mismatch threshold | Frame/line config consecutive CRC mismatch threshold (per lane) for re-train |
| Visual BERT mode Control | Enable/disable the visual BERT (Bit Error Rate Test) mode |
| Visual BERT display color control | Select the display color in visual BER test mode such as for a white-line display for errors on black background or black-line display for errors on white background |
| Live pixel data CRC control | Enable/disable live pixel data CRC mode |
| Error counter reset | Reset/enable the BER error counter in BER test mode and the CRC error counter in CRC mode |
| Error numbers per vertical line in visual BER test mode control and CRC | Controls the error numbers per vertical line in visual BER test and CRC modes (e.g., with 1 line including RGB 3 channels) |
| BER, CRC and powerdown counter mode control | Control the BER, CRC, powerdown count, and/or other counter modes (e.g., Cycling mode or Holding mode) |
| PWDN counter enable | Counters enable for powerdown count and/or other counts |
| CBAOD enable | Enable/disable CBAOD |
| CBAOD amplitude | Control CBAOD amplitude setting from a lowest amplitude to a highest amplitude |
| CBAOD base time | Control CBAOD base time |
| Internal gamma enable | Internal gamma enable |
| Gate line over drive time | Set Gate line over driver time (e.g., 0-255T) |
| Gate rise timing | Set gate rise time |
| Select GDIC | Select GDIC 1H, 2H or 4H |
| Gate Charge Base | Define gate off time. |
| VCOM reference voltage | Application specific Control VCOM reference voltage |
| VCOM estimator 0 | Control VCOM estimator 0 |
| VCOM estimator 1 | Control VCOM estimator 1 |
| VCOM estimator 2 | Control VCOM estimator 2 |
| VCOM estimator 3 | Control VCOM estimator 3 |
| Internal gamma | N-bit internal gamma |

Table 2 below lists various line configuration bits that may be included (e.g., encoded, scrambled, and/or XOR'd) in line configuration field 628 of line configuration packet 616.

| Line Config Bit(s) Name | Exemplary description and/or illustrative values |
|---|---|
| Frame Start | Mark Start of Active Frame. |
| Frame End | Mark End of Active Frame End |
| Polarity | Determine the polarity of driver output |
| Scramble Control | Enable/disable Scrambler |
| Scramble reset | Scrambler reset |
| Power Down Panel Discharge | Normal or Discharge. Gate driver IC active channel address (see below) is used to control gate driver during discharge. |
| DPS mode control | Enables dynamic power mode |
| Dynamic power management during power saving mode | Controls analog block power down during dynamic power saving. |
| Pixel charge timing | Set gate falling time relative to data line driver toggle. OE time is calculated as line time minus pixel charging time. Allows per line delay control range of 64T. |
| Gate driver IC active channel address | Drive the gate output corresponding to the address. |
| Control VCOM gain | Programmability for VCOM gain. |
| Control VCOM offset | Offset adjustment |
| CBAOD base time | CBAOD time adjustment |

As described in further detail hereinafter, frame configuration packet 614 and line configuration packets 616 may each include error-correction encoded configuration bits for transmission.

The error-correction encoded configuration bits may be generated by PDIt Encoder 306 of FIG. 3 by performing, for example a Hamming encoding and/or other operations on any or all of the frame configuration bits and/or the line configuration bits listed in Tables 1 and/or 2. PDIr(s) 250 decodes the error-correction encoded configuration bits accordingly and may perform 1-bit error correction.

Figure 7:
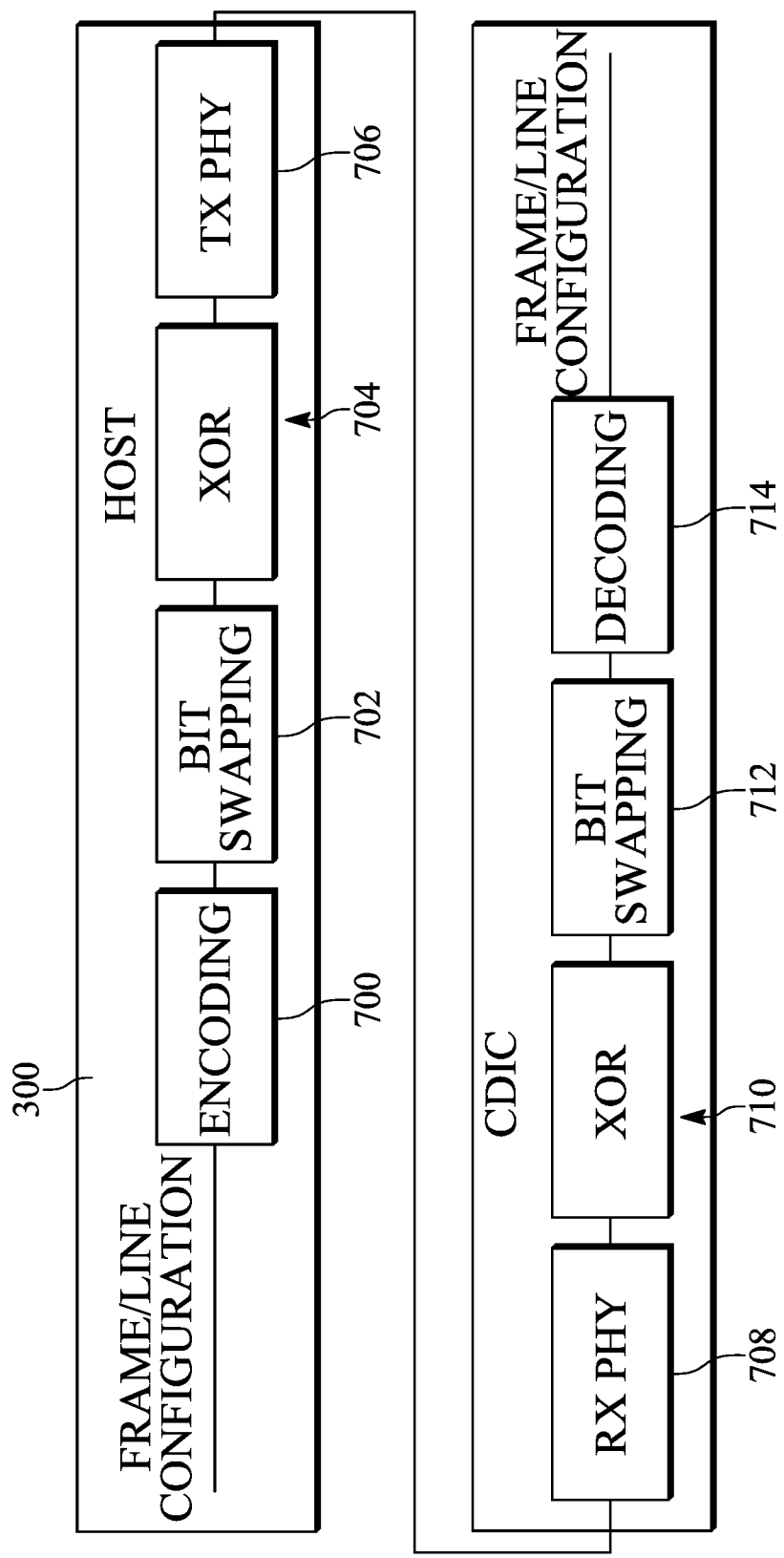
FIG. 7 illustrates a schematic block diagram of an encoding/decoding data flow for panel driver interface circuitry in accordance with various aspects of the subject technology.

In one suitable example shown in FIG. 7, PDIt Encoder 306 performs, for the frame configuration bits of each frame packet and for the line configuration bits of each line packet, a Hamming encoding 700 that allows 1-bit error correction. PDIt Encoder 306 may then perform a scrambling or bit position rearrangement (bit swapping) 702 on the Hamming encoded configuration bits (e.g., based on a swapping vector with which the original bit [3] is swapped to bit [1] location, bit [8] is swapped to bit [2] location and so on so forth). PDIt Encoder 306 may then perform an exclusive or (XOR) operation 704 on the Hamming encoded, bit-swapped configuration bits for transmission by the transmitter physical layer TX PHY 706.

The receiver physical layer RX PHY 708 receives the data packet and processes it in a reverse order. For example, the data packet is XOR'd 710, the data packet bit positions are descrambled or rearranged 712 based on an inverse of the swapping vector to recover the original bit positions, and the decoding 714 and error correction is performed with a parity bit check.

Equation (1) below shows an example of a Hamming generator matrix that can be used for Hamming encoding/decoding of frame and/or line configuration bits $$G = \begin{pmatrix} 1 & 0 & 0 & 0 & 0 & 0 & 1 & 1 & 0 & 1 \\ 0 & 1 & 0 & 0 & 0 & 0 & 0 & 1 & 1 & 0 \\ 0 & 0 & 1 & 0 & 0 & 0 & 0 & 0 & 1 & 1 \\ 0 & 0 & 0 & 1 & 0 & 0 & 1 & 1 & 0 & 0 \\ 0 & 0 & 0 & 0 & 1 & 0 & 0 & 1 & 0 & 1 \\ 0 & 0 & 0 & 0 & 0 & 1 & 1 & 1 & 1 & 0 \end{pmatrix} \quad (1)$$

Equation (2) below shows an example of how an encoded word such as (d1, d2, d3, d4, d5, d6, p1, p2, p3, p4) is generated by matrix multiplication of an original code word (d1, d2, d3, d4, d5, d6) and the generator matrix G.

$$\text{encoded word} = (d1 \ d2 \ d3 \ d4 \ d5 \ d6) \begin{pmatrix} 1 & 0 & 0 & 0 & 0 & 0 & 1 & 1 & 0 & 1 \\ 0 & 1 & 0 & 0 & 0 & 0 & 0 & 1 & 1 & 0 \\ 0 & 0 & 1 & 0 & 0 & 0 & 0 & 0 & 1 & 1 \\ 0 & 0 & 0 & 1 & 0 & 0 & 1 & 1 & 0 & 0 \\ 0 & 0 & 0 & 0 & 1 & 0 & 0 & 1 & 0 & 1 \\ 0 & 0 & 0 & 0 & 0 & 1 & 1 & 1 & 1 & 0 \end{pmatrix} = \quad (2)$$

$$(d1 \ d2 \ d3 \ d4 \ d5 \ d6 \ d1+d4+d6 \ d1+d2+d4+d5+d6 \ d2+d3+d6 \ d1+d3+d5) =$$

$$(d1 \ d2 \ d3 \ d4 \ d5 \ d6 \ p1 \ p2 \ p3 \ p4)$$

Equation (3) below shows an example of a parity-check matrix H for error detection and correction.

$$H = \begin{pmatrix} 1 & 0 & 0 & 1 & 0 & 1 & 1 & 0 & 0 & 0 \\ 1 & 1 & 0 & 1 & 1 & 1 & 0 & 1 & 0 & 0 \\ 0 & 1 & 1 & 0 & 0 & 1 & 0 & 0 & 1 & 0 \\ 1 & 0 & 1 & 0 & 1 & 0 & 0 & 0 & 0 & 1 \end{pmatrix}$$

Pixel data 612 (FIG. 6A) may be based on symbols that use explicit embedded clock edges and which consist of data and clock information. For example, one symbol may have 12 bits including 10 bits of data payload and 2 bits of clock information (e.g., CLK1 and CLK2). The 10-bit data payload can be pixel data or configuration information. The two clock bits have the same value (CLK1=CLK2), which is the inverse of the next data bit so that a transition is generated between CLK2 and the first data bit of the next symbol.

The pixel data mapping for 8-bit or 10-bit data per each color may use pixel-based data mapping for video data that is transmitted over two data channels and may be arranged with a LSB-first-MSB-last transmitting pattern and sub-pixel color data (e.g., RGB data) placed in both channels alternately. If the pixel data cannot completely fill out the field 632, field 632 may be filled out with zero-padded data.

FIGS. 8-11 show examples of uses of the frame configuration bits in Table 1 and/or line configuration bits in Table 2 for digital control of various display operations.

Figure 8:
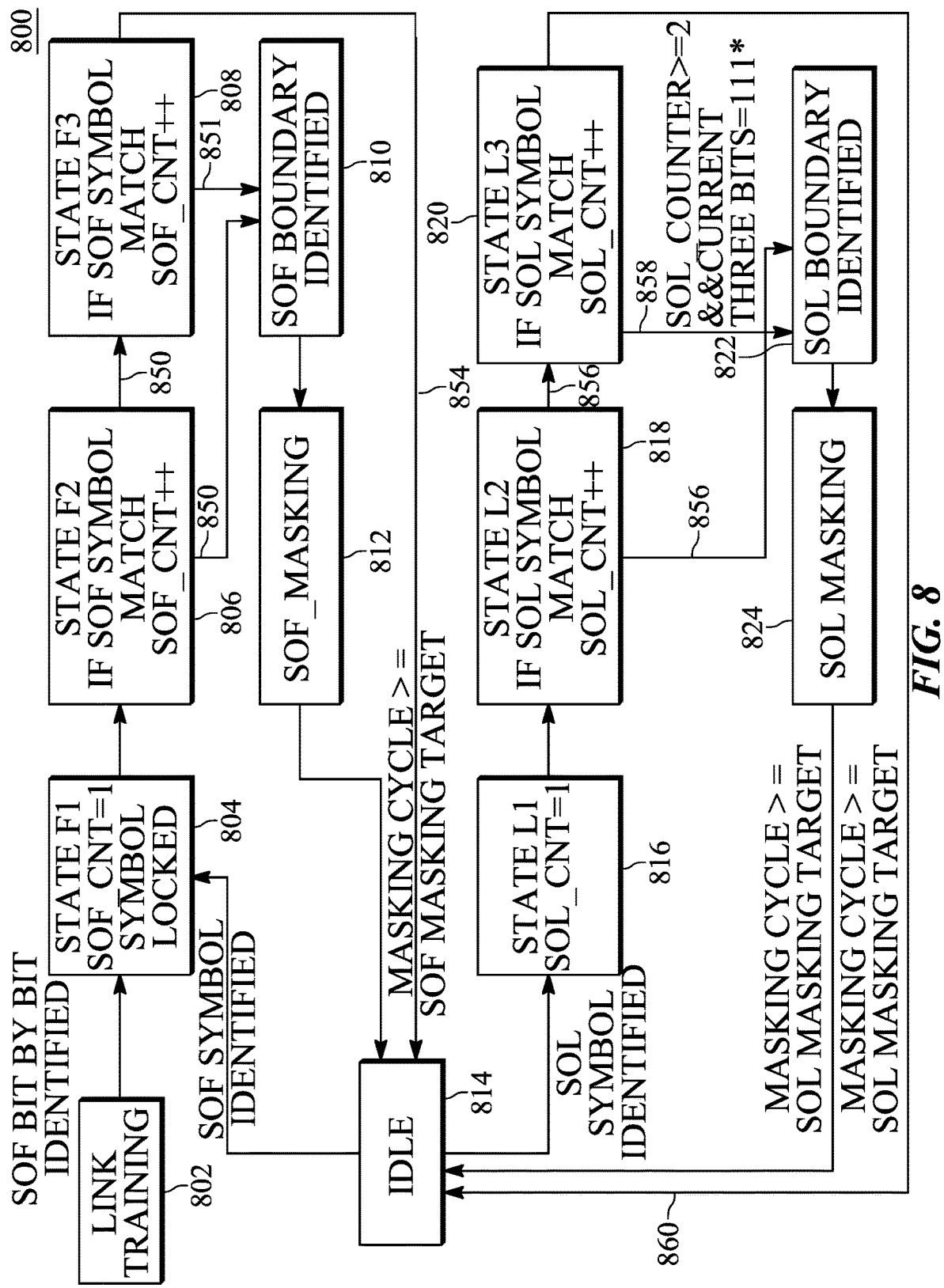
FIG. 8 illustrates a schematic start-of-frame/start-of-line state diagram of a panel driver interface in accordance with various aspects of the subject technology.
Figure 9A:
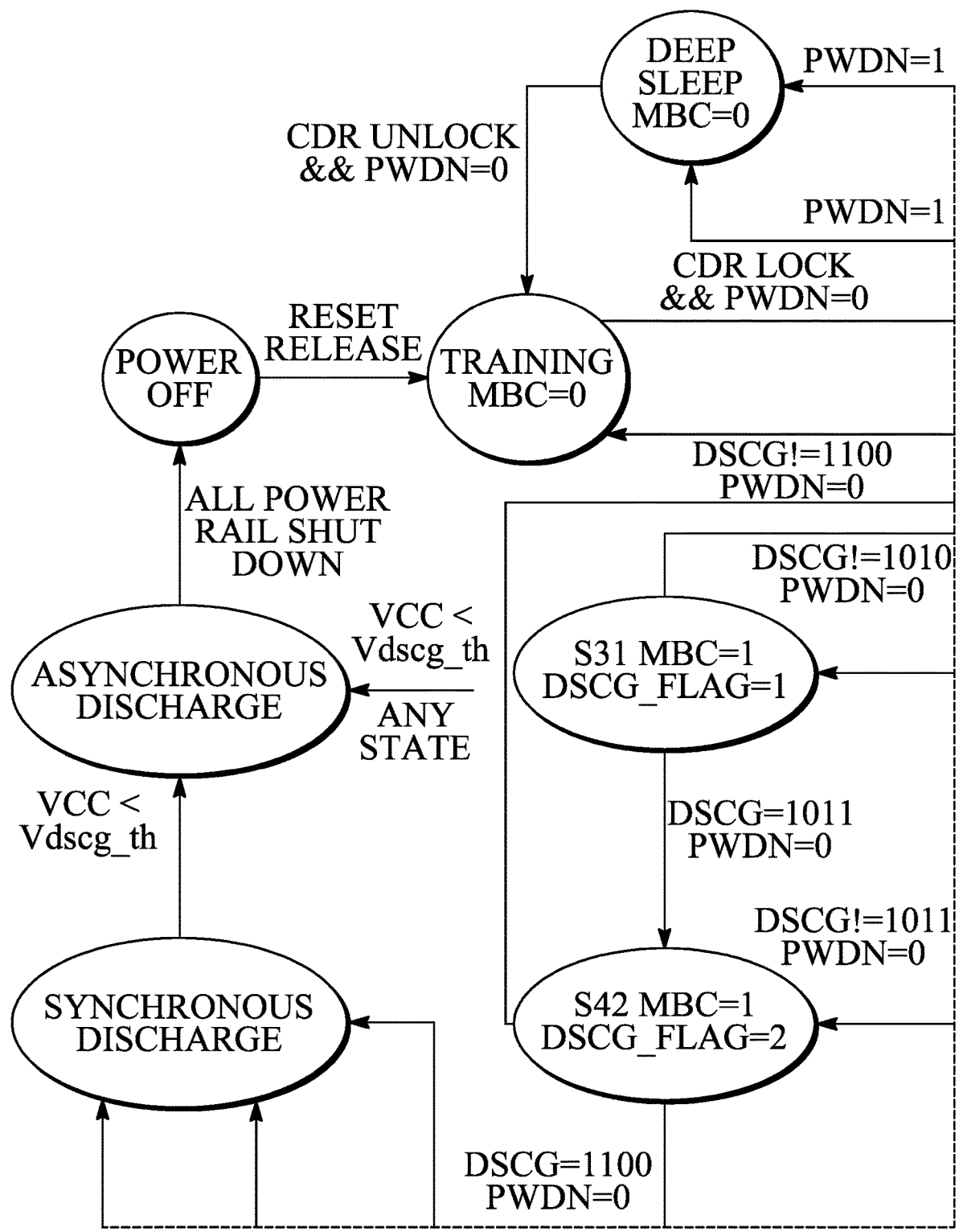
Figure 9B:
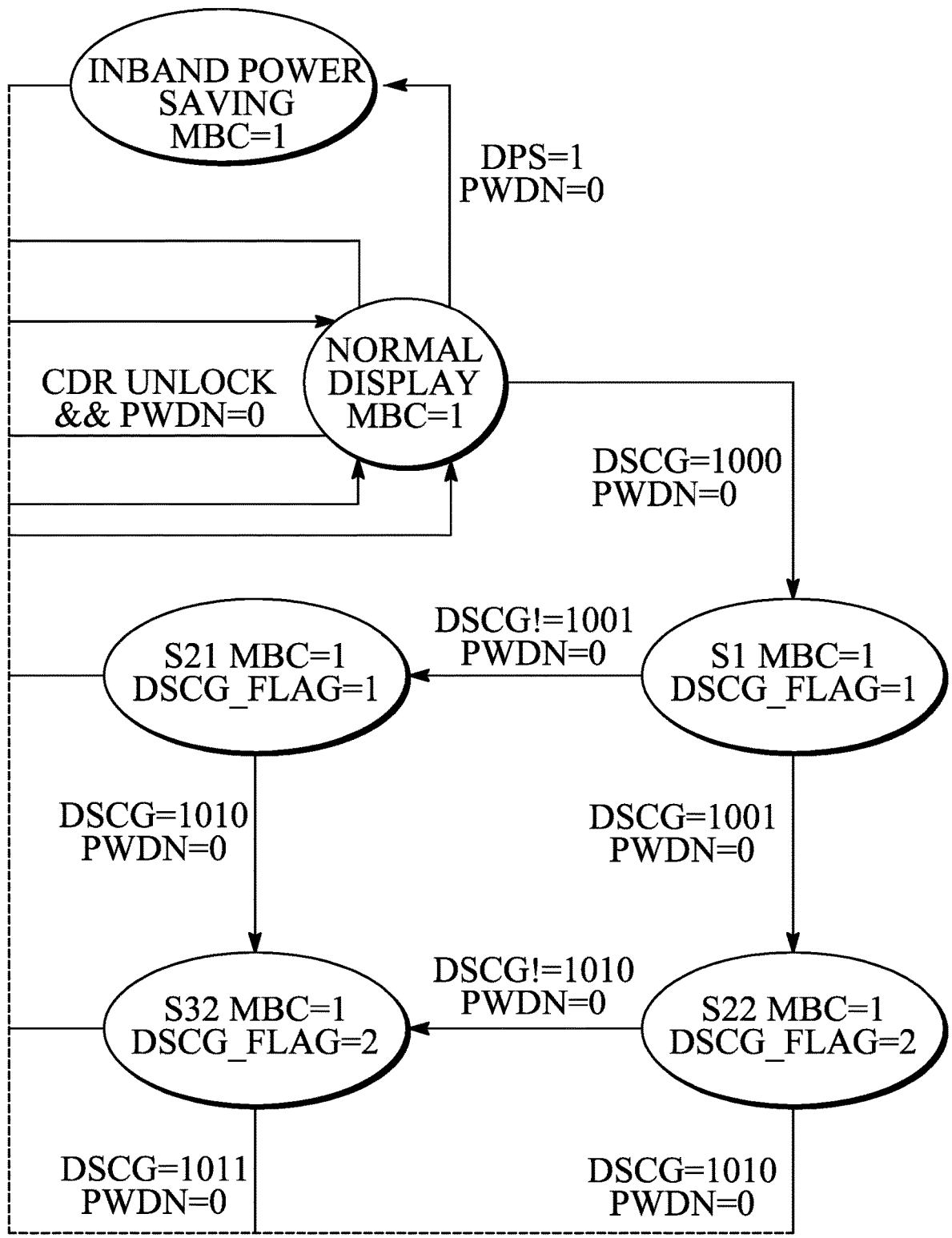
Figure 9C:
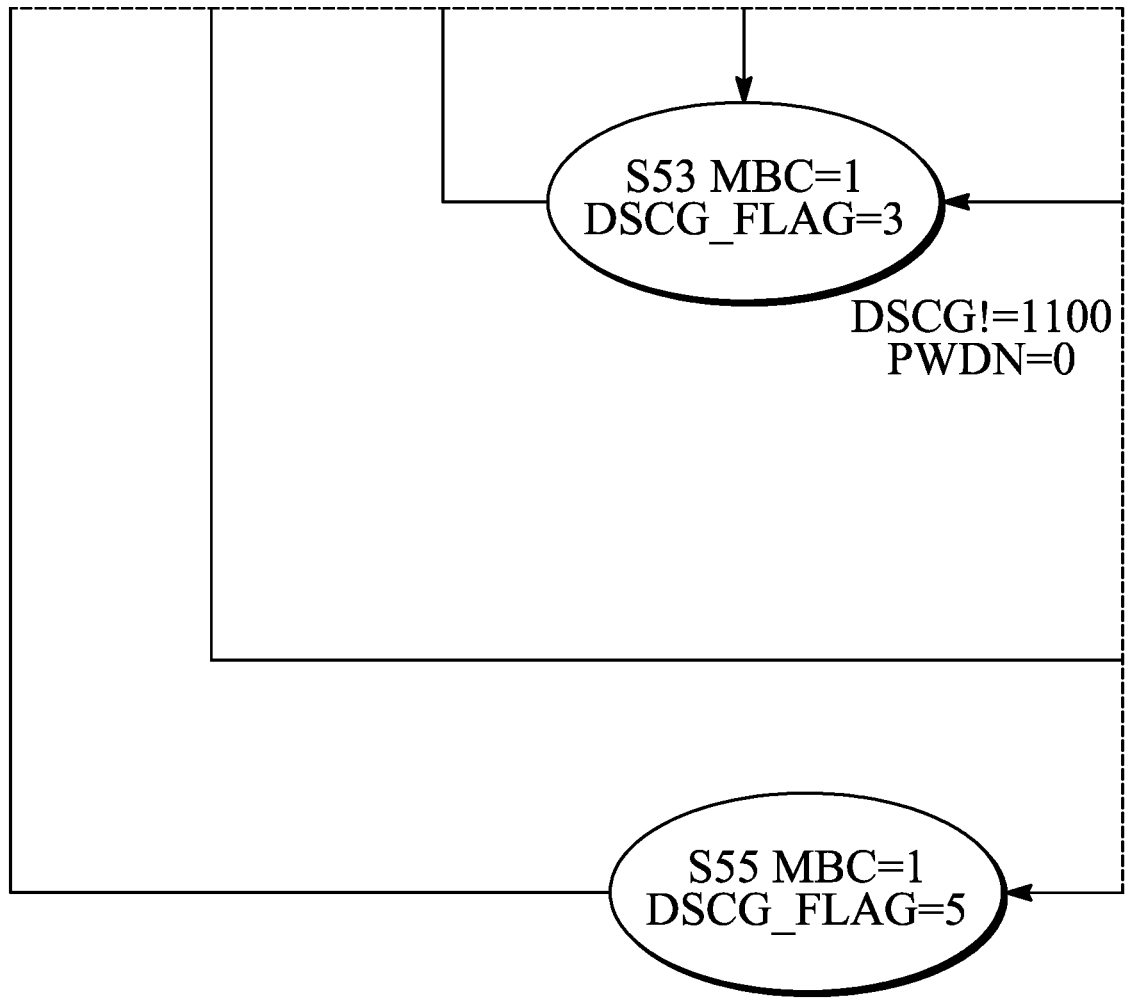
Figure 9D:
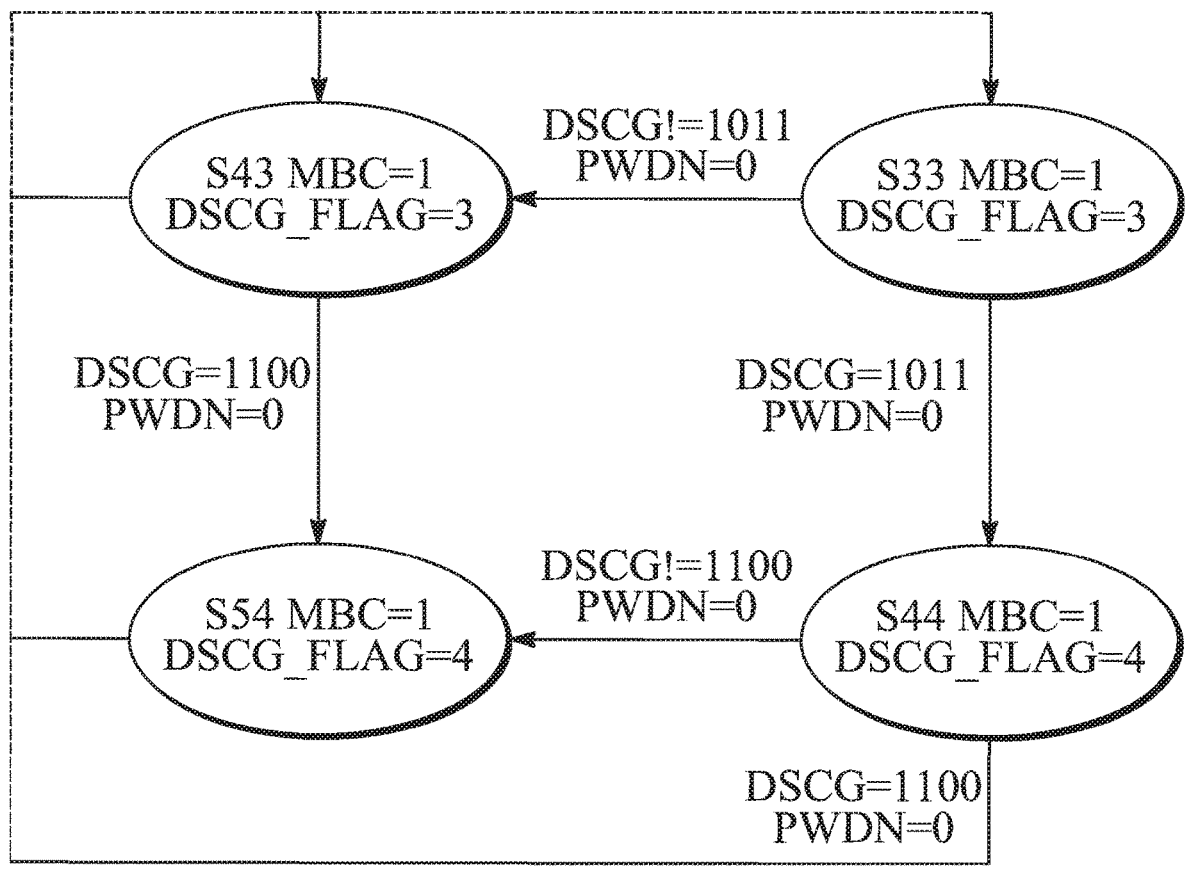

In particular, FIG. 8 illustrates a state diagram 800 for CDIC(s) 202 for performing a start-of-frame (SOF) and a start-of-line (SOL) operation using, for example, the frame packet start bits 618a, 618b, and 618c in field 618 and the line packet start bits 626a, 626b, and 626c in field 626 in the decoded digital display data from PDIr 250. As shown in FIG. 8, in accordance with aspects of the subject disclosure, SOF and SOL are protected by a special redundancy checking operation that is performed during SOF boundary and SOL boundary identification operations, using the first (e.g., three) bits of the frame configuration packet 614 (see, e.g., frame start packet 618 with start bits 618a, 618b, and 618c) and the first (e.g., three bits line configuration packet 616 (see, e.g., line start packet 626 with start bits 626a, 626b, and 626c). This SOF/SOL redundancy checking as shown in FIG. 8 dramatically reduces the probability of loss of frame packet/line packet, which improves the user experience. In one example, a link training state 802 transitions to a state F1 804 when SOF bit(s) are identified. An idle state 814 also transitions to state 804 when a SOF symbol is identified. The state diagram transitions from state F1 804 to state F2 806 if SOF symbol matches SOF count++. Then, the state diagram transitions to state F3 808 if SOF count=2 and current bits have certain value (e.g., 100) after hamming decoding at operation 850 or transitions to state 810 with SOF boundary identified and SOF count=2 and current bits have certain value (e.g., 100). The diagram transitions from state 808 to state 810 at operation 851 when SOF count>=2 and current bits have certain value (e.g., 100).

SOF masking occurs at state 812. The diagram transitions to state 814 if masking cycle is greater than or equal to SOF masking target. The diagram transitions from state 808 to state 814 if operation 854 (e.g., SOF count=1, SOF count greater than equal to 2 and current bits have certain value (e.g., 100)) occurs after hamming decoding. The state 814 transitions to state 816 when SOL symbol is identified. Then, state 818 occurs if SOL symbol matches SOL count++. State 818 transitions to state 820 if operation 856 (e.g., SOL counter=2, and current bits have certain value (e.g., 111)) occurs after hamming decoding. The diagram transitions from state 820 to state 822 if operation 858 (e.g., SOL counter>=2 and current bits have certain value (e.g., 111)) occurs after hamming decoding. The diagram transitions from state 820 to state 814 if operation 860 (e.g., SOL counter=1, SOL count>=2 and current bits have certain value (e.g., 111)) occurs after hamming decoding.

In another example, FIGS. 9A-9E illustrate a state diagram for performing an in-band discharge operation using power down panel discharge bits (e.g., Power Down Panel Discharge) in the line configuration bits in field 628 in the decoded digital display data from PDIr 250.

In some examples, in-band integrated gate driver signaling is provided through the high-speed link of PDIr 250. This allows flexible control to fit specific panel requirements, row re-ordering operations, and partial updates in the middle of a display frame by gate line addressing. CDIC discharge state is a state in that all CDIC outputs are connected to ground level. This present design supports in-band discharge through protocol configuration bits DISCHARGE[3:0] besides asynchronous discharge based on monitoring VDD voltage threshold. A transmitter can send DISCHARGE[3:0] with the following sequence: 1000, 1001, 1010, 1011, 1100, then keep 1100. The following state diagram of FIGS. 9A-9E show how a receiver decodes DISCHARGE[3:0] sequence to safely enter "synchronous discharge" state. All data line driver IC outputs shall be connected to ground in this state until power off. Previously, only an asynchronous discharge state was available. The present design provides software control shutdown as illustrated with the Sx states.

Figure 10:
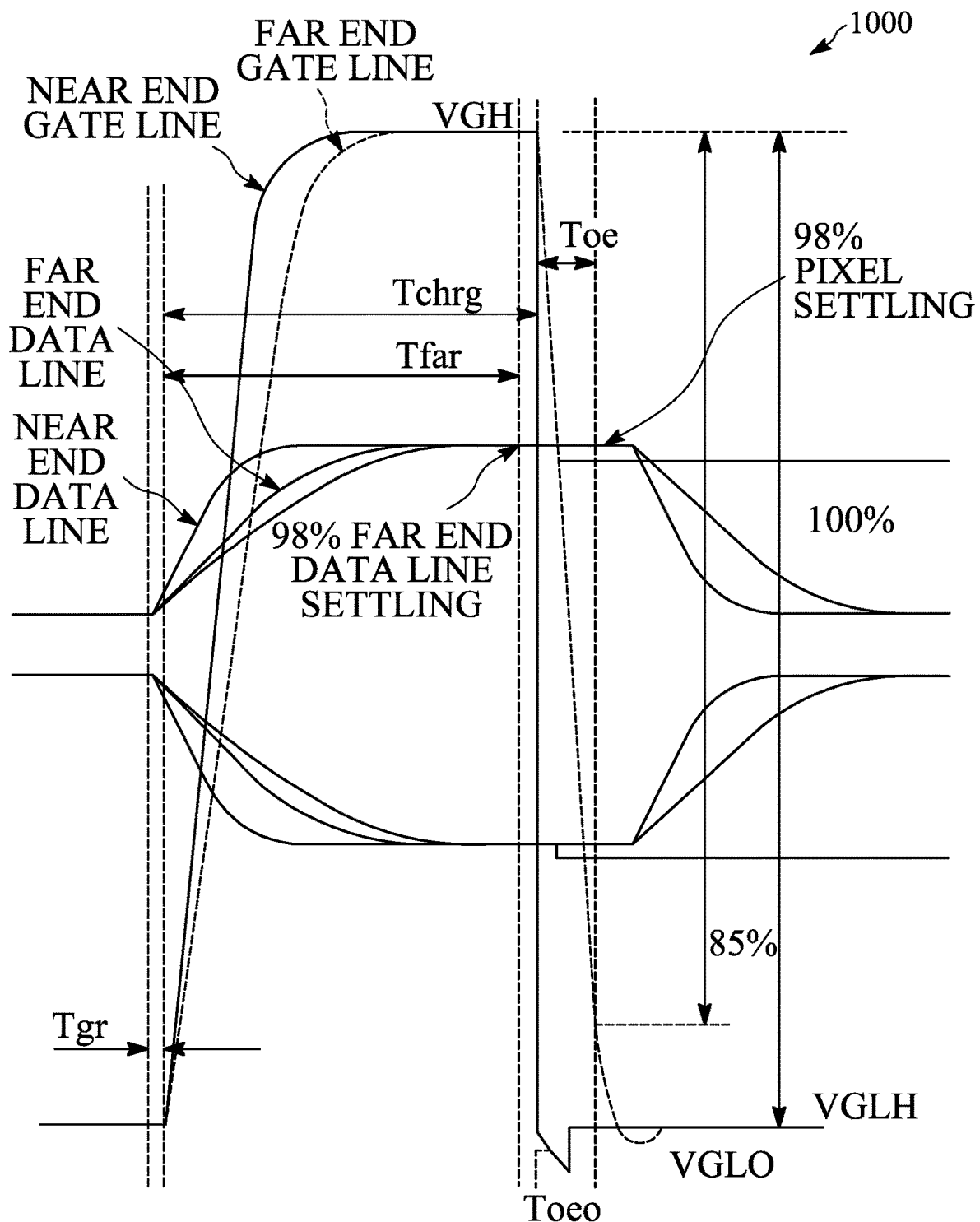
FIG. 10 illustrates a schematic timing diagram for self-aligned charging times in accordance with various aspects of the subject technology.

In another example, FIG. 10 is a timing diagram 1000 illustrating a self-aligned charging time operation that may be performed using gate charge base bits (e.g., Gate Charge Base) in the frame configuration bits in field 620 in the decoded digital display data from PDIr 250 and using pixel charge timing bits (e.g., Pixel charge timing) in line configuration bits in field 628 in the decoded digital display data from PDIr 250.

Figure 11:
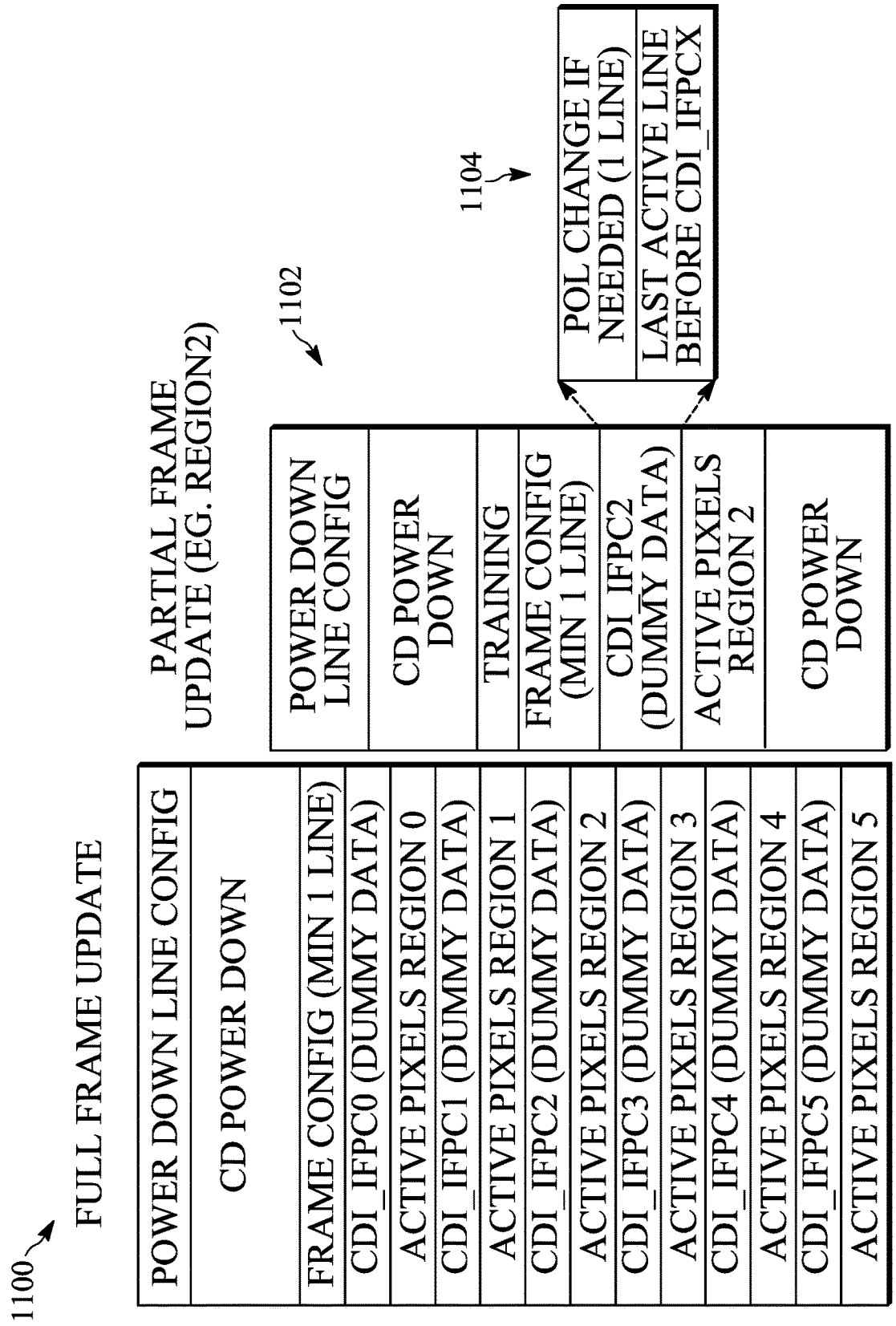
FIG. 11 illustrates a schematic diagram of data structures for full frame and partial frame updates including support for row-based refreshes and intra-frame polarity changes in accordance with various aspects of the subject technology.
Figure 12B:
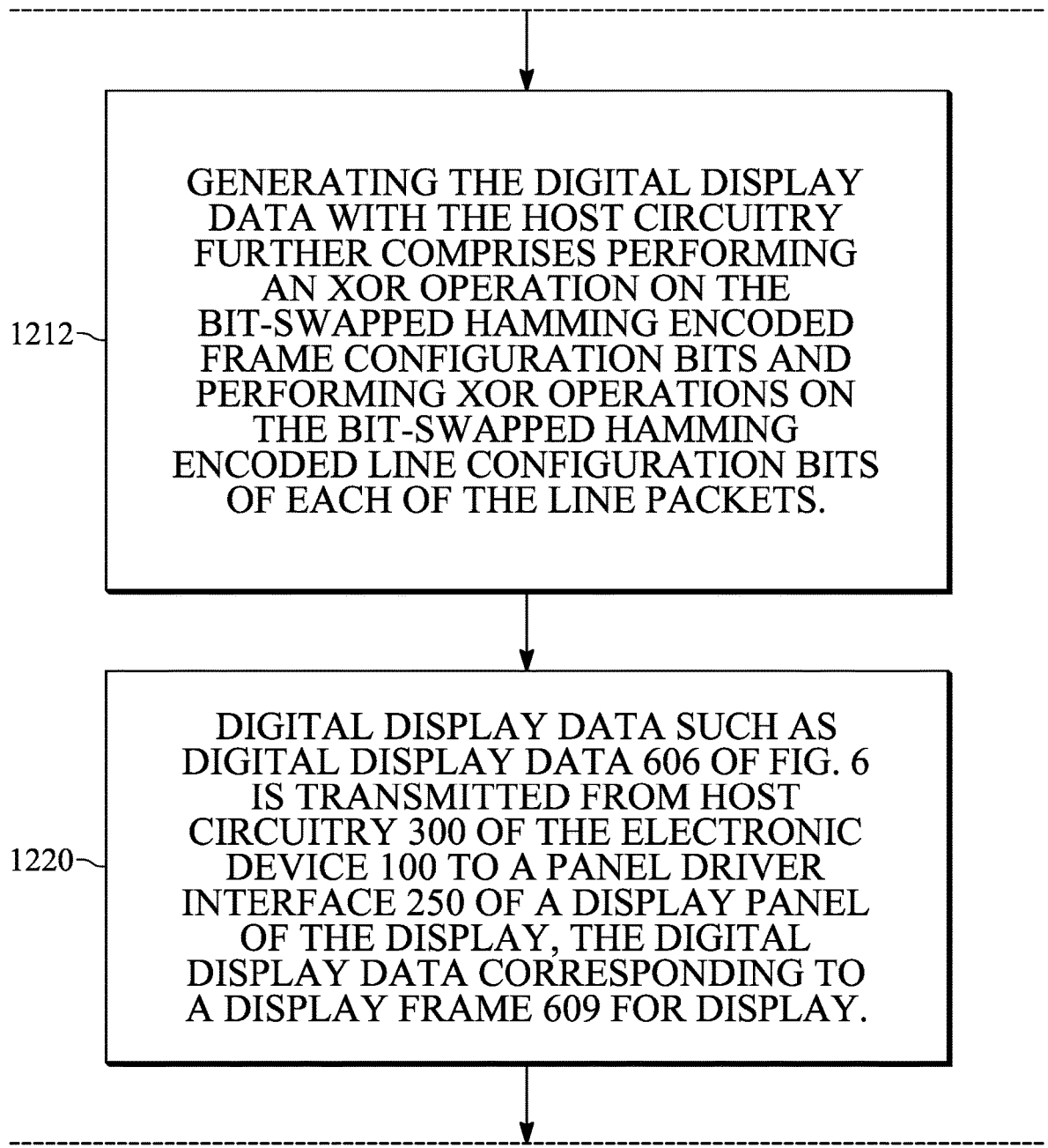
Figure 12C:
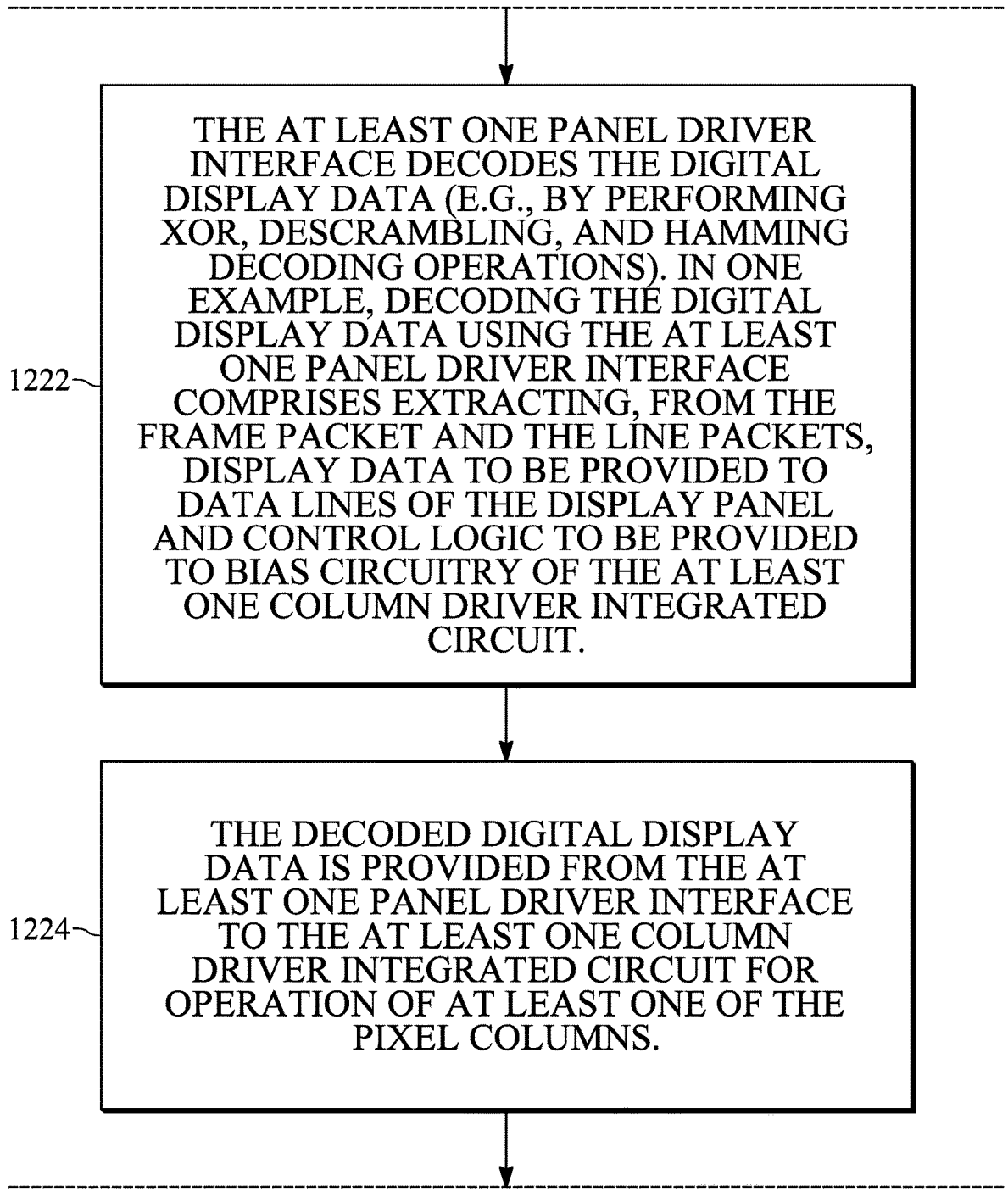
Figure 12E:
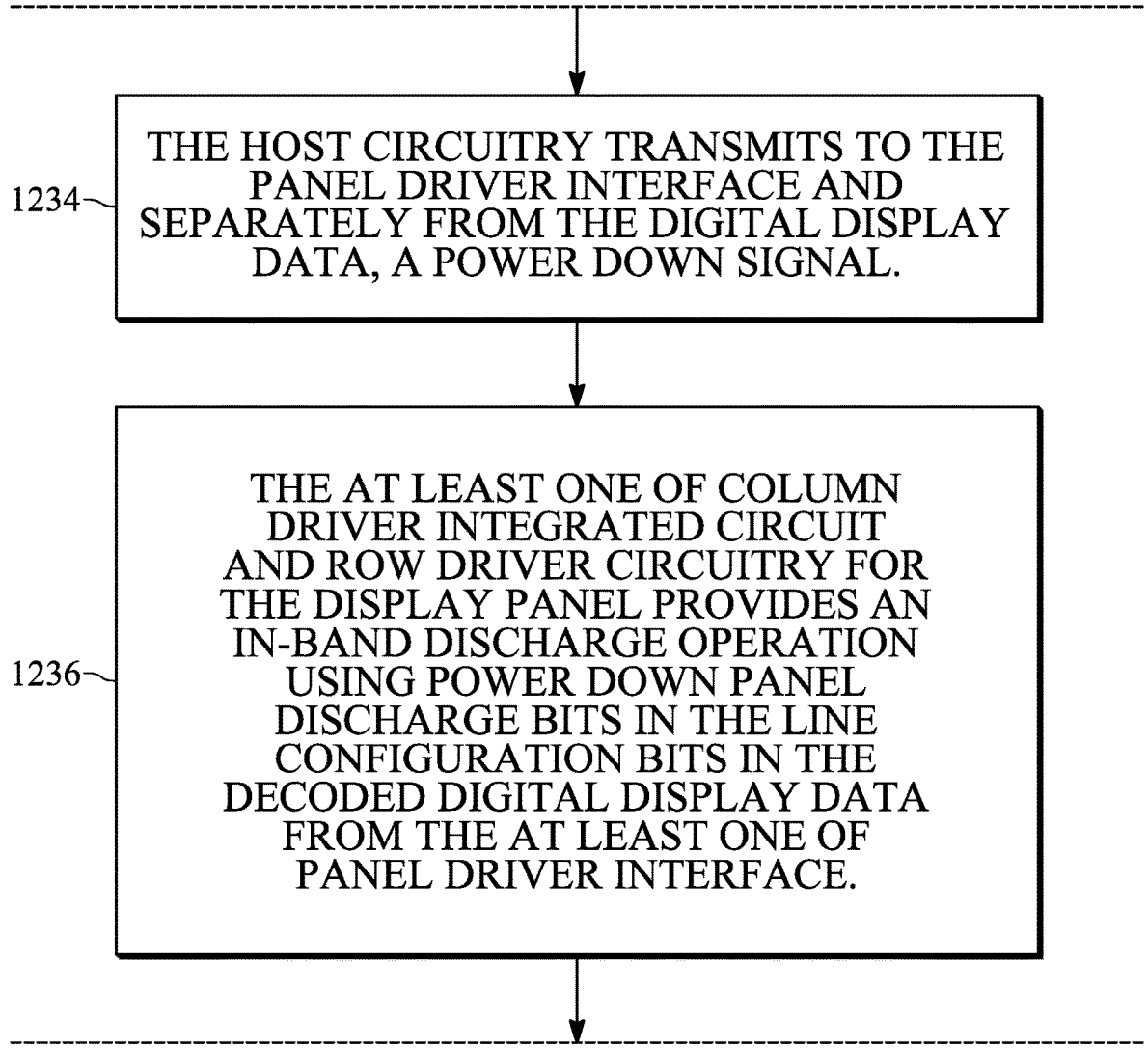

In another example, FIG. 11 illustrates a row-based refresh operation and intra-frame polarity change (IFPC) operations that can be performed using active channel address bits (e.g., Gate driver IC active channel address) in the line configuration bits in field 628 in the decoded digital display data from the at least one panel driver interface More specifically, FIG. 11 illustrates two cases: a full frame update 1100 together with IFPC operations and a partial frame update 1102 with an IFPC operation 1104 and in which only one section of rows is updated. Advantageously, one or more portions of one or more driver integrated circuits can be powered down during portions of the partial frame update 1102 in which no updates are occurring.

The partial frame update operations and IFPC operations illustrated in FIG. 11 are facilitated by the ability to digitally control (e.g., arbitrary) row re-ordering operations using the active channel address bits (e.g., Gate driver IC active channel address). With this row-reordering ability, one or several partial row sections can be displayed on a display panel without refreshing the whole frame. This allows further power saving.

It should also be appreciated that various other display panel control operations can be performed by CDIC(s) 202 and/or row drivers 204 using the frame configuration bits and line configuration bits described above in Tables 1 and/or 2. As another example, analog VCOM operations can be performed using VCOM reference voltage and Control VCOM offset bits and/or digital VCOM operations can be performed using VCOM reference voltage, Control VCOM offset, and VCOM estimator bits (e.g., VCOM estimator) in the frame configuration bits in field 620 in the decoded digital display data from PDIr 250.

In yet other examples, display panel control operations that can be provided using the frame configuration bits and line configuration bits described above in Tables 1 and/or 2 include separate frame and line configuration (see, e.g., packets 614 and 616 of FIG. 6); DLL (delay locked loop)/PLL (phase locked loop) RX (receiver) CDR (clock data recovery) support; column inversion, z-inversion; frame start/end indication (see, e.g., Frame Start and Frame End); polarity control of main buffer outputs (see, e.g., Polarity); programmable controls such as termination resistance of RX (see, e.g., Termination control); RX equalizer gain; RX CDR configuration (see, e.g., CDR control); shift direction (see, e.g., Shift direction control)—first data start from the first physical channel or the last physical channel; Gamma buffer chopping (see, e.g., Gamma amp chopping control); Gamma buffer bias (see, e.g., Gamma amp bias control); main buffer chopping (see, e.g., Output amp bias control); main buffer bias (see, e.g., Output amp chopping control); per port driver output delay (two independent segments per port, see, e.g., First and second half output amplifiers delay timing control), internal gamma (see, e.g., Internal gamma enable); in-band dynamic power saving, PWDN (power down) dynamic power saving; CBBC (Content based bias control, see, e.g., CBBC Enable, CBBC mode); CBAOD (Content based analog over drive, see, e.g., CBAOD base time); in-band discharge (see, e.g., Power Down Panel Discharge); in-system test functions; visual BER (Bit Error Rate) test mode (see, e.g., Visual BERT mode Control, Error numbers per vertical line in visual BER test mode control and CRC, Visual BERT display color control, BER, CRC and power-down counter mode control, Error counter reset); CRC (Cyclic Redundancy Check, see, e.g., Live pixel data CRC control) test mode; error numbers per vertical line in visual BERT (bit error rate test, see, e.g., Error numbers per vertical line in visual BER test mode control and CRC); BERT/CRC error count (see, e.g., Error counter reset); CHIP ID read access control through MBC (Multi-Purpose Back Channel) link (see, e.g., Read access control); live CRC (Cyclic Redundancy Check) control (see, e.g., Live pixel data CRC control); BERT/CRC error hold or loop around control; Desense mode control; Unique ID (16 bit); chip ID; gate driver timing control; gate driver address control; gate line delay sense; intra-frame polarity change; partial panel update; VCOM gain per line control (see, e.g., Control VCOM gain); VCOM offset per line control (see, e.g., Control VCOM offset).

FIGS. 12A-12G depict a flow diagram of an example process for operating a display for an electronic device in accordance with various aspects of the subject technology. For explanatory purposes, the example process of FIGS. 12A-12G is described herein with reference to the components of FIGS. 1-3, 6, and 7. Further for explanatory purposes, the blocks of the example process (method) of FIGS. 12A-12G are described herein as occurring in series, or linearly. However, multiple blocks of the example process of FIGS. 12A-12G may occur in parallel. In addition, the blocks of the example process of FIGS. 12A-12G need not be performed in the order shown and/or one or more of the blocks of the example process of FIGS. 12A-12G need not be performed.

In the depicted example flow diagram, at block 1201, prior to transmitting the digital display data at block 1220, the host circuitry generates the digital display data by performing a Hamming encoding of frame configuration bits for the display frame to form the error-correction encoded frame configuration bits and performing Hamming encodings of line configuration bits for each of the line packets to form the error-correction encoded line configuration bits. At block 1210, generating the digital display data with the host circuitry further comprises performing a bit swapping operation on the Hamming encoded frame configuration bits and performing bit swapping operations on the Hamming encoded line configuration bits of each of the line packets.

At block 1212, generating the digital display data with the host circuitry further comprises performing an XOR operation on the bit-swapped Hamming encoded frame configuration bits and performing XOR operations on the bit-swapped Hamming encoded line configuration bits of each of the line packets.

At block 1220, digital display data such as digital display data 606 of FIG. 6A is transmitted from host circuitry 300 of the electronic device 100 to a panel driver interface 250 of a display panel of the display, the digital display data corresponding to a display frame 609 for display. The digital display data may include a frame packet 614 for the display frame. The frame packet may include error-correction encoded frame configuration bits (620). The digital display data may also include line packets 616 for the display frame. Each line packet may include error-correction encoded line configuration bits (628) and pixel data (632) for display by a pixel row. The error-correction encoded frame configuration bits and the error-correction encoded line configuration bits may be generated by the host circuitry by performing Hamming encoding, scrambling (bit swapping), and XOR operations on frame configuration bits and line configuration bits for the display frame. The frame packet may further comprise frame packet start bits before the error-correction encoded frame configuration bits and cyclic-redundancy check bits after the error-correction encoded frame configuration bits. Each of the line packets comprises line packet start bits before the error-correction encoded line configuration bits and cyclic-redundancy check bits after the error-correction encoded line configuration bits.

At block 1222, the at least one panel driver interface decodes the digital display data (e.g., by performing XOR, descrambling, and Hamming decoding operations). In one example, decoding the digital display data using the at least one panel driver interface comprises extracting, from the frame packet and the line packets, display data to be provided to data lines of the display panel and control logic to be provided to bias circuitry of the at least one column driver integrated circuit.

At block 1224, the decoded digital display data is provided from the at least one panel driver interface to the at least one column driver integrated circuit for operation of at least one of the pixel columns.

At block 1230, the at least one of column driver integrated circuit and row driver circuitry for the display panel performs a start-of-frame alignment operation and a start-of-line alignment operation using the decoded digital display data from the at least one panel driver interface. The start-of-frame alignment operation comprises performing a redundancy check using the frame packet start bits and wherein performing the start-of-line alignment operation comprises performing a redundancy check using the line packet start bits.

In one example, the frame packet is a frame configuration packet within a vertical blanking frame packet, and wherein the frame packet comprises a plurality of padding bits that, in combination with the frame packet start bits, the cyclic-redundancy check bits and the error-correction encoded frame configuration bits define a length that corresponds to a length of the line packet.

At block 1232, the at least one panel driver interface provides to the host circuitry, a multi-purpose backchannel signal. At block 1234, the host circuitry transmits to the panel driver interface and separately from the digital display data, a power down signal.

At block 1236, the at least one of column driver integrated circuit and row driver circuitry for the display panel provides an in-band discharge operation using power down panel discharge bits in the line configuration bits in the decoded digital display data from the at least one panel driver interface. At block 1238, the at least one of column driver integrated circuit and row driver circuitry for the display panel provides a self-aligned charging time operation using gate charge base bits in the frame configuration bits in the decoded digital display data from the at least one panel driver interface and using pixel charge timing bits in line configuration bits in the decoded digital display data from the at least one panel driver interface.

At block 1239, the at least one of column driver integrated circuit and row driver circuitry for the display panel provides a row re-ordering operation using gate driver integrated circuit active channel address bits in the line configuration bits in the decoded digital display data from the at least one panel driver interface. At block 1240, the at least one of column driver integrated circuit and row driver circuitry for the display panel performs a row-based refresh operation based on the gate driver integrated circuit active channel address bits in the line configuration bits in the decoded digital display data from the at least one panel driver interface.

At block 1242, the at least one of column driver integrated circuit and row driver circuitry for the display panel performs an intra-frame polarity change operation based on the gate driver integrated circuit active channel address bits in the line configuration bits in the decoded digital display data from the at least one panel driver interface. At block 1244, the at least one of column driver integrated circuit and row driver circuitry for the display panel performs a digital VCOM operation using VCOM estimator bits in the frame configuration bits in the decoded digital display data from the at least one panel driver interface.

Figure 13:
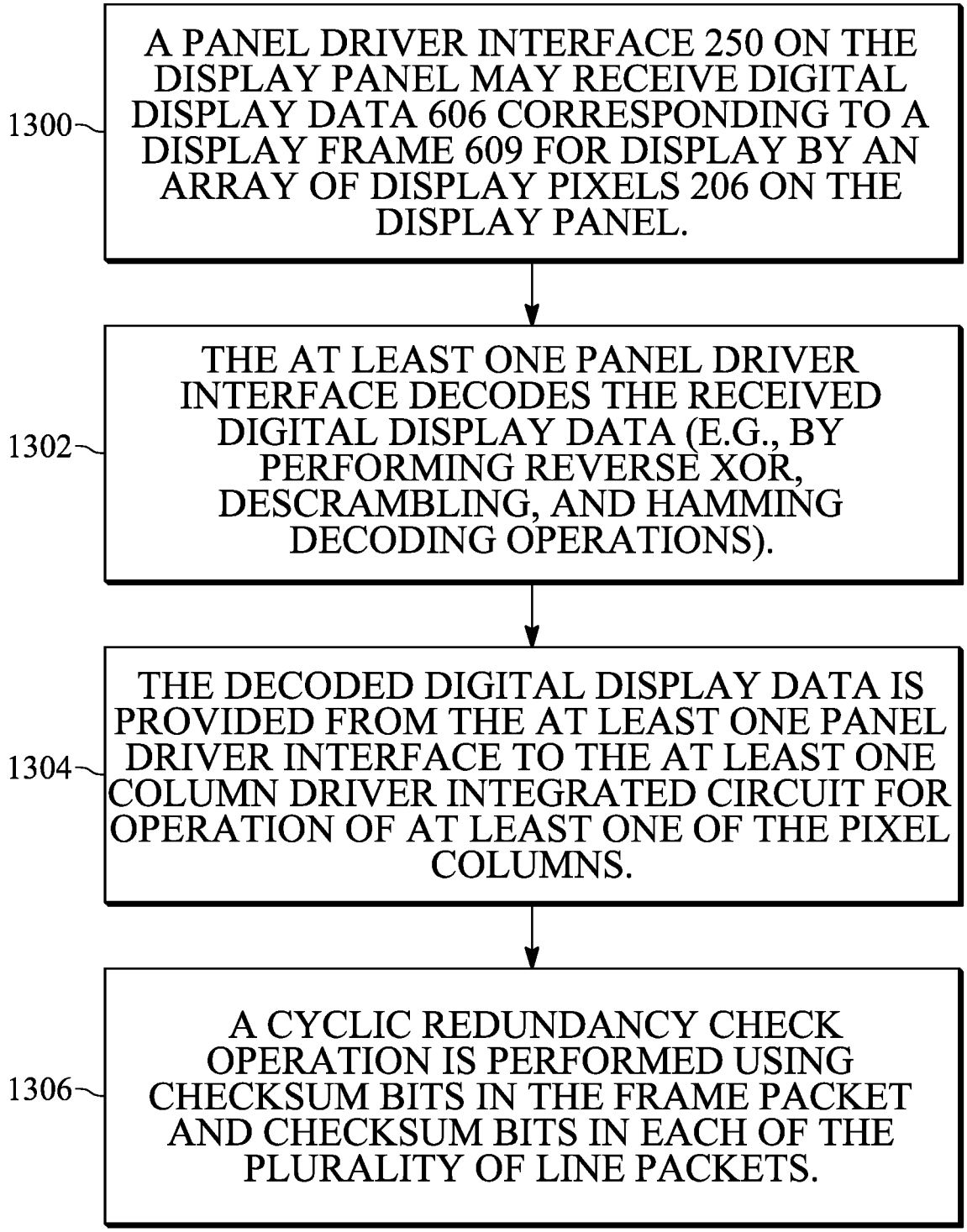
FIG. 13 illustrates a flow chart of an example process for operating a display panel of electronic device display in accordance with various aspects of the subject technology.

FIG. 13 depicts a flow diagram of an example process for operating a display panel for an electronic device in accordance with various aspects of the subject technology. For explanatory purposes, the example process of FIG. 13 is described herein with reference to the components of FIGS. 1-3, 6, and 7. Further for explanatory purposes, the blocks of the example process of FIG. 13 are described herein as occurring in series, or linearly. However, multiple blocks of the example process of FIG. 13 may occur in parallel. In addition, the blocks of the example process of FIG. 13 need not be performed in the order shown and/or one or more of the blocks of the example process of FIG. 13 need not be performed.

In the depicted example flow diagram, at block 1300 a panel driver interface 250 on the display panel may receive digital display data 606 corresponding to a display frame 609 for display by an array of display pixels 206 on the display panel. The digital display data may include a frame packet 614 for the display frame. The frame packet may include error-correction encoded frame configuration bits (620). The digital display data may also include line packets 616 for the display frame. Each line packet may include error-correction encoded line configuration bits (628) and pixel data (632) for display by a pixel row. The error-correction encoded frame configuration bits and the error-correction encoded line configuration bits may be generated by the host circuitry by performing Hamming encoding, scrambling (bit swapping), and XOR operations on frame configuration bits and line configuration bits for the display frame.

At block 1302, the at least one panel driver interface decodes the received digital display data (e.g., by performing reverse XOR, descrambling, and Hamming decoding operations).

At block 1304, the decoded digital display data is provided from the at least one panel driver interface to the at least one column driver integrated circuit for operation of at least one of the pixel columns. At block 1306, a cyclic redundancy check operation is performed using checksum bits in the frame packet and checksum bits in each of the plurality of line packets.

In accordance with various aspects of the subject disclosure, a method of operating an display of an electronic device is provided. The display includes a display panel with an array of display pixels arranged in pixel rows and pixel columns, at least one column driver integrated circuit communicatively coupled to the pixel columns, and at least one panel driver interface communicatively coupled between host circuitry for the electronic device and the at least one column driver integrated circuit. The method includes transmitting, from the host circuitry to the panel driver interface, digital display data corresponding to a display frame for display. The digital display data includes a frame packet for the display frame, the frame packet including error-correction encoded frame configuration bits. The display data also includes a plurality of line packets for the display frame, each line packet including error-correction encoded line configuration bits and pixel data for display by a pixel row. The method also includes decoding the digital display data using the at least one panel driver interface. The method also includes providing the decoded digital display data from the at least one panel driver interface to the at least one column driver integrated circuit for operation of at least one of the pixel columns.

In accordance with other aspects of the subject disclosure, a method of operating a display panel of an electronic device display is provided, the method including receiving, with a panel driver interface on the display panel, digital display data corresponding to a display frame for display by an array of display pixels on the display panel. The digital display data includes a frame packet for the display frame, the frame packet including error-correction encoded frame configuration bits. The digital display data also includes a plurality of line packets for the display frame, each line packet including error-correction encoded line configuration bits and pixel data for display by a pixel row. The method also includes decoding the digital display data with the panel driver interface. The method also includes providing the decoded digital display data to at least one column driver integrated circuit on the display panel for operation of at least one column of display pixels in the array.

In accordance with other aspects of the subject disclosure, a display for an electronic device having host circuitry is provided, the display including a display panel having an array of display pixels arranged in pixel rows and pixel columns, at least one column driver integrated circuit communicatively coupled to the pixel columns, and at least one panel driver interface communicatively coupled between host circuitry for the electronic device and the at least one column driver integrated circuit. The at least one panel driver interface is configured to receive, from the host circuitry, digital display data corresponding to a display frame for display. The digital display data includes a frame packet for the display frame, the frame packet comprising error-correction encoded frame configuration bits. The digital display data further includes a plurality of line packets for the display frame, each line packet including error-correction encoded line configuration bits and pixel data for display by a pixel row. The at least one panel driver interface is further configured to decode the digital display data and provide the decoded digital display data to the at least one column driver integrated circuit for operation of at least one of the pixel columns.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design. The phrase "at least one of A and B" should be understood to mean "only A, only B, or both A and B."

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method of operating a display of an electronic device, the display having a display panel with an array of display pixels arranged in pixel rows and pixel columns, at least one column driver integrated circuit communicatively coupled to the pixel columns, and at least one panel driver interface communicatively coupled between host circuitry for the electronic device and the at least one column driver integrated circuit, the method comprising:
    transmitting, from the host circuitry to the panel driver interface, digital display data corresponding to a display frame for display, wherein the digital display data comprises:
        a frame packet for the display frame, the frame packet comprising error-correction encoded frame configuration bits; and
        a plurality of line packets for the display frame, each line packet including error-correction encoded line configuration bits and pixel data for display by a pixel row;
    decoding the digital display data using the at least one panel driver interface; and
    providing the decoded digital display data from the at least one panel driver interface to the at least one column driver integrated circuit for operation of at least one of the pixel columns.

2. The method of claim 1, further comprising, prior to transmitting the digital display data, generating the digital display data with the host circuitry by:
    performing a Hamming encoding of frame configuration bits for the display frame to form the error-correction encoded frame configuration bits; and
    performing Hamming encodings of line configuration bits for each of the line packets to form the error-correction encoded line configuration bits.

3. The method of claim 2, wherein generating the digital display data with the host circuitry further comprises:
    performing a bit swapping operation on the Hamming encoded frame configuration bits; and
    performing bit swapping operations on the Hamming encoded line configuration bits of each of the line packets.

4. The method of claim 3, wherein generating the digital display data with the host circuitry further comprises:
    performing an XOR operation on the bit-swapped Hamming encoded frame configuration bits; and
    performing XOR operations on the bit-swapped Hamming encoded line configuration bits of each of the line packets.

5. The method of claim 1, wherein the frame packet further comprises frame packet start bits before the error-correction encoded frame configuration bits and cyclic-redundancy check bits after the error-correction encoded frame configuration bits.

6. The method of claim 5, wherein each of the line packets comprises line packet start bits before the error-correction encoded line configuration bits and cyclic-redundancy check bits after the error-correction encoded line configuration bits.

7. The method of claim 6, further comprising performing, with the at least one of column driver integrated circuit and row driver circuitry for the display panel a start-of-frame alignment operation and a start-of-line alignment operation using the decoded digital display data from the at least one panel driver interface.

8. The method of claim 7, wherein performing the start-of-frame alignment operation comprises performing a redundancy check using the frame packet start bits and wherein performing the start-of-line alignment operation comprises performing a redundancy check using the line packet start bits.

9. The method of claim 5, wherein the frame packet is a frame configuration packet within a vertical blanking frame packet, and wherein the frame packet comprises a plurality of padding bits that, in combination with the frame packet start bits, the cyclic-redundancy check bits and the error-correction encoded frame configuration bits define a length that corresponds to a length of the line packet.

10. The method of claim 1, further comprising providing, with the at least one panel driver interface to the host circuitry, a multi-purpose backchannel signal.

11. The method of claim 1, further comprising transmitting, from the host circuitry to the panel driver interface and separately from the digital display data, a power down signal.

12. The method of claim 1, further comprising performing, with the at least one of column driver integrated circuit and row driver circuitry for the display panel, an in-band discharge operation using power down panel discharge bits in the line configuration bits in the decoded digital display data from the at least one panel driver interface.

13. The method of claim 1, further comprising performing, with the at least one of column driver integrated circuit and row driver circuitry for the display panel, a self-aligned charging time operation using gate charge base bits in the frame configuration bits in the decoded digital display data from the at least one panel driver interface and using pixel charge timing bits in line configuration bits in the decoded digital display data from the at least one panel driver interface.

14. The method of claim 1, further comprising performing, with the at least one of column driver integrated circuit and row driver circuitry for the display panel, a row re-ordering operation using gate driver integrated circuit active channel address bits in the line configuration bits in the decoded digital display data from the at least one panel driver interface.

15. The method of claim 14, further comprising performing, with the at least one of column driver integrated circuit and row driver circuitry for the display panel, a row-based refresh operation based on the gate driver integrated circuit active channel address bits in the line configuration bits in the decoded digital display data from at least one panel driver interface.

16. The method of claim 14, further comprising performing, with the at least one of column driver integrated circuit and row driver circuitry for the display panel, an intra-frame polarity change operation based on the gate driver integrated circuit active channel address bits in the line configuration bits in the decoded digital display data from the at least one panel driver interface.

17. The method of claim 1, further comprising performing, with the at least one of column driver integrated circuit and row driver circuitry for the display panel, a digital VCOM operation using VCOM estimator bits in the frame configuration bits in the decoded digital display data from the at least one panel driver interface.

18. The method of claim 1, wherein decoding the digital display data using the at least one panel driver interface comprises extracting, from the frame packet and the line packets, display data to be provided to data lines of the display panel and control logic to be provided to bias circuitry of the at least one column driver integrated circuit.

19. A method of operating a display panel of an electronic device display, the method comprising:
receiving, with a panel driver interface on the display panel, digital display data corresponding to a display frame for display by an array of display pixels on the display panel, wherein the digital display data comprises:
a frame packet for the display frame, the frame packet comprising error-correction encoded frame configuration bits; and
a plurality of line packets for the display frame, each line packet including error-correction encoded line configuration bits and pixel data for display by a pixel row;
decoding the digital display data with the panel driver interface; and
providing the decoded digital display data to at least one column driver integrated circuit on the display panel for operation of at least one column of display pixels in the array.

20. The method of claim 19, further comprising:
performing a cyclic redundancy check operation using checksum bits in the frame packet and checksum bits in each of the plurality of line packets.

21. A display for an electronic device having host circuitry, the display comprising:
a display panel having:
an array of display pixels arranged in pixel rows and pixel columns;
at least one column driver integrated circuit communicatively coupled to the pixel columns; and
at least one panel driver interface communicatively coupled between host circuitry for the electronic device and the at least one column driver integrated circuit, wherein the at least one panel driver interface is configured to:
receive, from the host circuitry, digital display data corresponding to a display frame for display, wherein the digital display data comprises:
a frame packet for the display frame, the frame packet comprising error-correction encoded frame configuration bits; and
a plurality of line packets for the display frame, each line packet including error-correction encoded line configuration bits and pixel data for display by a pixel row;
decode the digital display data; and
provide the decoded digital display data to the at least one column driver integrated circuit for operation of at least one of the pixel columns.

22. The display of claim 21, wherein the at least one panel driver interface is further configured to provide, to the host circuitry, a first multi-purpose backchannel signal that indicates a lock between the at least one column driver integrated circuit and the host circuitry.

23. The display of claim 22, wherein the host circuitry comprises a timing controller for the display, wherein the at least one column driver integrated circuit comprises multiple column driver integrated circuits coupled to the timing controller, wherein the at least one panel driver interface is further configured to provide, to the timing controller, a second multi-purpose backchannel signal that indicates a loss of lock between one of the multiple column driver integrated circuits and the timing controller, and wherein the timing controller is configured to force unlock of another one of the multiple column driver integrated circuits responsive to receipt of the second multi-purpose backchannel signal.

24. The display of claim 22, wherein the host circuitry comprises a timing controller for the display, wherein the at least one column driver integrated circuit comprises multiple column driver integrated circuits coupled to the timing controller, wherein the at least one panel driver interface is further configured to provide, to the timing controller, a second multi-purpose backchannel signal that indicates a loss of lock between one of the multiple column driver integrated circuits and the timing controller, and wherein the timing controller is configured to cause another one of the multiple column driver integrated circuits to enter a link training mode responsive to receipt of the second multi-purpose backchannel signal.

* * * * *